(12) United States Patent
Hotaka et al.

(10) Patent No.: US 6,808,804 B2
(45) Date of Patent: Oct. 26, 2004

(54) SHEET-FORM LAYERED STRUCTURE WITH ATTRACTIVE APPEARANCE AND UTILIZATION THEREOF

(75) Inventors: Toshiaki Hotaka, Tokyo (JP); Kazuma Hisaki, Tokyo (JP); Ikkoh Furukawa, Tokyo (JP)

(73) Assignee: Teijin Chemicals, Ltd., Tokyo (JP)

( * ) Notice: Subject to any disclaimer, the term of this patent is extended or adjusted under 35 U.S.C. 154(b) by 141 days.

(21) Appl. No.: 10/110,747

(22) PCT Filed: Aug. 13, 2001

(86) PCT No.: PCT/JP01/06990

§ 371 (c)(1),
(2), (4) Date: Apr. 16, 2002

(87) PCT Pub. No.: WO02/16132

PCT Pub. Date: Feb. 28, 2002

(65) Prior Publication Data

US 2003/0021917 A1 Jan. 30, 2003

(30) Foreign Application Priority Data

| Aug. 18, 2000 | (JP) | ......................................... 2000-248467 |
| Oct. 6, 2000 | (JP) | ......................................... 2000-307171 |
| Oct. 18, 2000 | (JP) | ......................................... 2000-317793 |
| Feb. 20, 2001 | (JP) | ......................................... 2001-043923 |

(51) Int. Cl.[7] .......................... B32B 19/00; B32B 19/02
(52) U.S. Cl. .................. 428/357; 428/35.7; 428/36.91; 428/156; 428/172; 428/412; 428/913.3
(58) Field of Search .................... 428/35.7, 36.91, 428/156, 172, 412, 413.3

(56) References Cited

U.S. PATENT DOCUMENTS

| 4,310,370 A | * | 1/1982 | Arai et al. ................... 156/230 |
| 4,414,731 A | * | 11/1983 | Riemer ........................ 29/453 |
| 4,749,605 A | * | 6/1988 | Berger ........................ 428/156 |
| 5,580,932 A | | 12/1996 | Koike |
| 5,812,332 A | * | 9/1998 | Freeman ..................... 359/894 |

FOREIGN PATENT DOCUMENTS

| JP | 53-83884 | 7/1978 |
| JP | 56-123235 | 9/1981 |
| JP | 58064249 | 4/1983 |
| JP | 01082957 | 6/1989 |
| JP | 1-206010 | 8/1989 |
| JP | 1-249336 | 10/1989 |
| JP | 3051128 | 3/1991 |
| JP | 4093246 | 3/1992 |
| JP | 6-31862 | 2/1994 |
| JP | 6278261 | 10/1994 |
| JP | 7-125000 | 5/1995 |
| JP | 9136392 | 5/1997 |

* cited by examiner

*Primary Examiner*—Harold Pyon
*Assistant Examiner*—Marc Patterson
(74) *Attorney, Agent, or Firm*—Wenderoth, Lind & Ponack, L.L.P.

(57) ABSTRACT

A highly elaborately designed sheet-shaped laminated structure wherein: (1) the sheet-shaped laminated structure is a sheet-shaped laminated structure composed of at least two layers formed of a thermoplastic resin, (2) at least one outer layer forming a surface of said laminated structure is a layer (B) formed of a transparent resin, (3) at least one layer composing said laminated structure contains a dye, a pigment or a light-diffusing agent and has a monotonous thickness change at least in one direction of a sheet surface of the laminated structure, and (4) said laminated structure shows a continuous change in color tone along the sheet surface when visually observed toward an outer surface of the layer (B) formed of a transparent resin, and use thereof.

31 Claims, 13 Drawing Sheets

F I G. 1
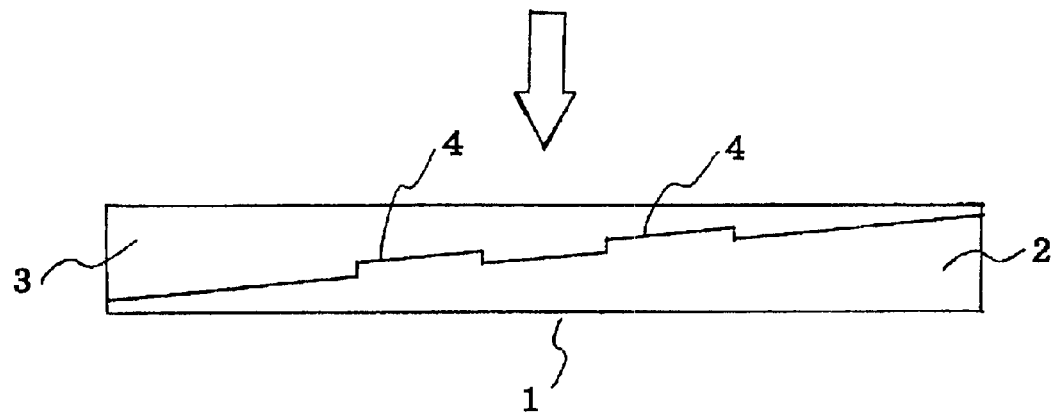
F I G. 2
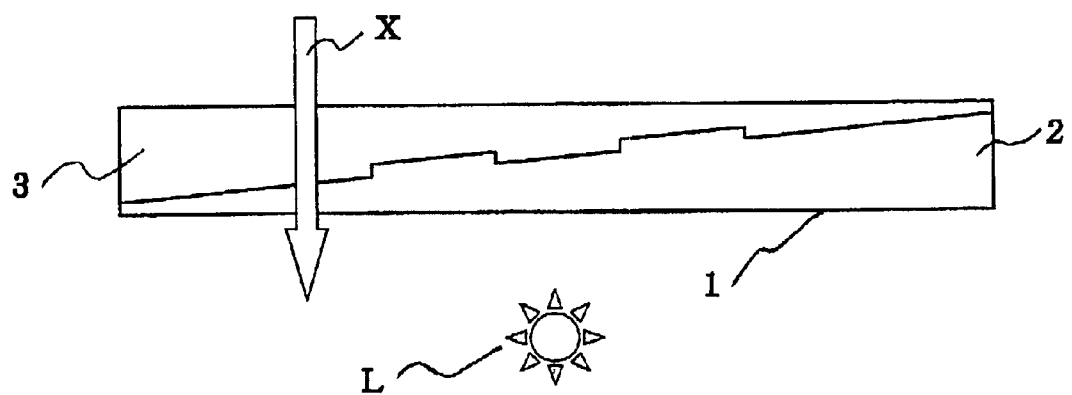

F I G. 5
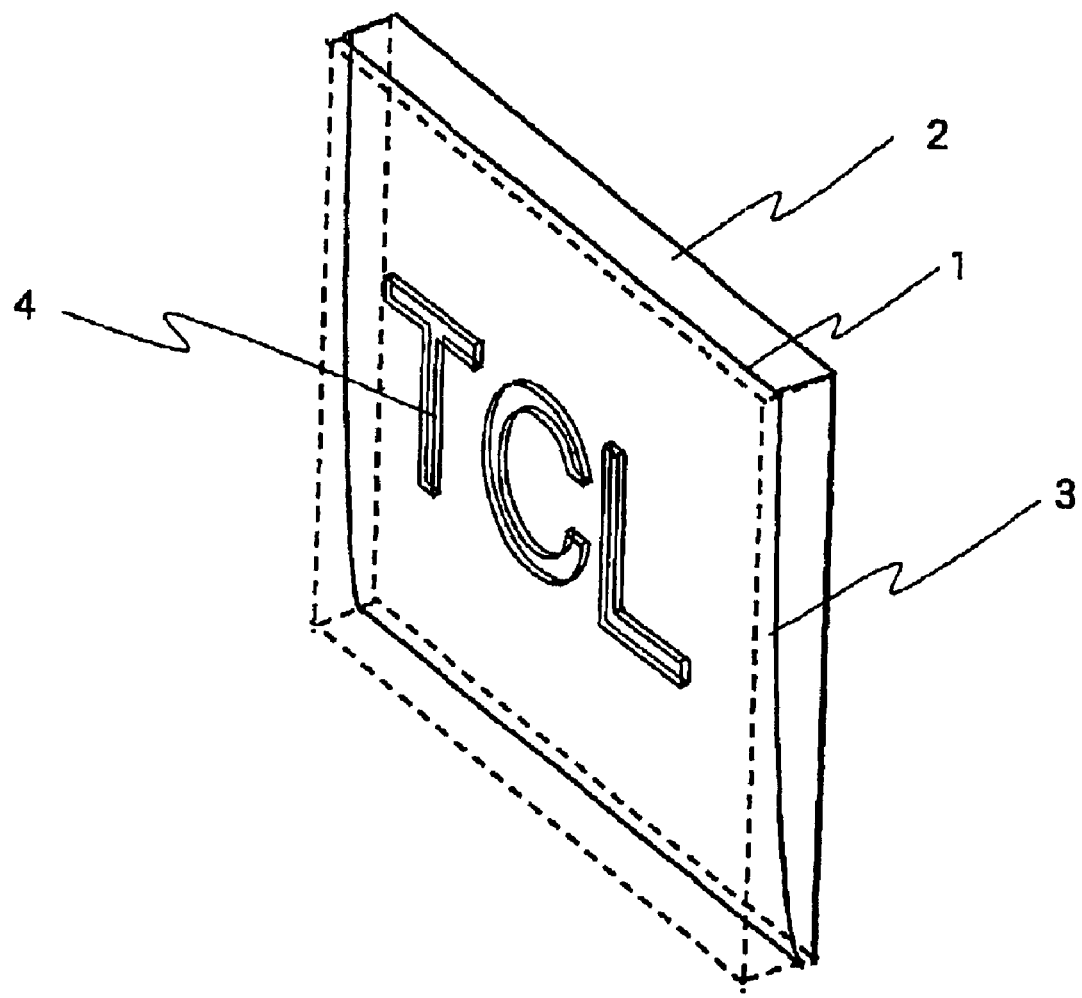

[14-A]

[14-B]

SHEET-FORM LAYERED STRUCTURE WITH ATTRACTIVE APPEARANCE AND UTILIZATION THEREOF

DETAILED DESCRIPTION OF THE INVENTION

1. Field of the Invention

The present invention relates to a sheet-shaped laminated structure that is made of a thermoplastic resin and excellent in gracefulness and design, and use thereof. More specifically, it relates to a sheet-shaped laminated structure that shows a continuous change in color tone along a sheet surface when viewed from an outside, and use thereof.

2. Prior Art

In recent years, product designs for increasing the value of a product, particularly, highly elaborative designs of molded articles made of resins are demanded. Among them is an improvement of a design by a continuous change in color tone (gradation coloring). As one method for improving a design, there is employed a molding method in which a film or sheet having a print, etc., of a gradation pattern is placed in a mold beforehand and a resin is injection-molded, such as an insert molding method. However, this method requires a number of steps of preparing a sheet, printing, trimming, and the like, and it cannot be said that the method is fully attractive with regard to a design.

JP-A-53-83884 or JP-A-56-123235 proposes a container having an inner layer and an outer layer varied in thickness, the outer layer being composed of a resin containing a colorant, and having a color in gradation in a vertical direction, and a molding method therefor. In the molded article (container) obtained by the method described in each of the above publications, however, the direction of gradation of the color is vertical in constitution, and it is limited to a container having an upper or lower portion densely colored or having a relatively simple color-tone. Further, the above method has a difficulty in producing a molded article having a three-dimensional pattern (a letter, a character or a figure) formed in an interfacial portion of the layers.

As explained above, there has not been provided any relatively thick, plate-shaped laminated structure that has a high standard of design, which has a continuous color tone change that can be not only in one direction but also in multi-directions, and which can have a clear three-dimensional pattern in an interfacial portion of layers.

Problems to be Solved by the Invention

It is therefore a first object of the present invention to provide a sheet-shaped laminated structure that is excellent in gracefulness and design, has a continuous change in color tone and is composed of a plurality of layers formed of a thermoplastic resin.

It is a second object of the present invention to provide a sheet-shaped laminated structure that has a continuous change in color tone which change can be not only in one direction along a sheet surface but also in multi-directions and which permits a combination of a plurality of colors.

It is a third object of the present invention to provide a sheet-shaped laminated structure having a clear three-dimensional pattern such as a character (or letter) or a figure on a sheet surface having a continuous change in color tone.

It is another object of the present invention to provide a sheet-shaped laminated structure that has a thickness sufficient for retaining a form, which is transparent or semi-transparent and has a continuous change in color tone.

It is a further another object of the present invention to provide a sheet-shaped laminated structure that has practical strength for advantageous use as a decorative glass window, an interior decoration member, a glass window for a display case, a partition, a door, a window glass for an automobile, an outer plate of an automobile, a lamp cover, an ornament, an instrumental panel or center panel for an automobile, an interior or exterior decoration lace and a garnish for an automobile, a display device, a display board, a light guide plate, a beacon plate, a windshield plate, a roof material, furniture, a housing member for various office automation machines such as a computer and a portable terminal, a housing member for various electric machines such as a cellular phone and a portable audio device, an illumination panel for a slot machine, etc., and a material for miscellaneous goods.

It is still further another object of the present invention to provide a highly elaborately designed illuminator that utilizes a continuous change in transparent or semi-transparent color tone.

Means to Solve the Problems

According to studies made by the present inventors, the above objects of the present invention can be achieved by a highly elaborately designed sheet-shaped laminated structure wherein:

(1) the sheet-shaped laminated structure is a sheet-shaped laminated structure composed of at least two layers formed of a thermoplastic resin each, (2) at least one outer layer forming a surface of said laminated structure is a layer (B) formed of a transparent resin, (3) at least one layer composing said laminated structure contains a dye, a pigment or a light diffusing agent and has a monotonous thickness change at least in one direction of a sheet surface of the laminated structure, and (4) said laminated structure shows a continuous change in color tone along the sheet surface when visually observed toward an outer surface of the layer (B) formed of a transparent resin.

The laminated structure of the present invention will be explained in detail hereinafter.

The laminated structure of the present invention includes many embodiments of combinations depending upon number of layers, forms of each layer, coloring or non-coloring of each layer, or kinds of colors, and further, the laminated structure shows a change in gracefulness and a design depending upon directions in which the laminated structure is visually observed and directions in which a light source is placed. While these are sources that exhibit the features and advantages of the laminated structure of the present invention, the laminated structure of the present invention will be explained with reference to drawings for an understanding thereof.

BRIEF DESCRIPTION OF DRAWINGS

FIG. 1 is a schematic drawing showing a form of a cross section, taken at right angles with a sheet surface, of one example of the sheet-shaped laminated structure of the present invention.

FIG. 2 is a side view of the laminated structure of the present invention, which shows a schematic drawing when a design is observed while a light source (L) is placed behind the laminated structure according to a back light system.

FIG. 5 is a schematic perspective view of form outline of a molded article forming a layer (A) of a laminated structure used in Example.

FIG. 10-B is a schematic cross-sectional view of the window glass, in which a densely colored portion is formed of PC (B) and a white portion is formed of PC (A).

FIG. 12-A shows a primary injection step, in which PC (B) is filled in a mold.

FIG. 12B shows the step of opening the mold after a molded article formed of PC (B) is cooled.

FIG. 12-C shows the step of replacing a mold cavity by sliding the mold.

FIG. 12-D shows the step of closing the mold in the state of the above 12-C. A core plate is in a backward position, and the mold is closed in a state where the cavity volume of the mold is greater than a molding volume of the second layer.

FIG. 12-E shows a secondary injection step, in which a predetermined amount of a resin (PC (A)) is filled in the mold cavity in the state of the above 12-D.

FIG. 12F shows the step of the core plate moving forward in the mold cavity due to the movement of a cylinder for the core plate, to compress the resin to a predetermined amount. The compression is started before completion of filling the resin (PC (A)).

FIG. 14-B is a schematic cross-sectional view of a lower half portion the illuminating globe in FIG. 13, in which a densely colored portion formed of PC (D) and a white portion is formed of PC (C).

FIG. 15-B is a schematic cross-sectional view, taken along a vertical direction, of a plate-shaped laminated structure forming the above box-shaped container, in which a densely colored portion is formed of PC (B) and PC (G) and a white portion is formed of PC (C).

EXPLANATION OF SYMBOLS

Figure 3:
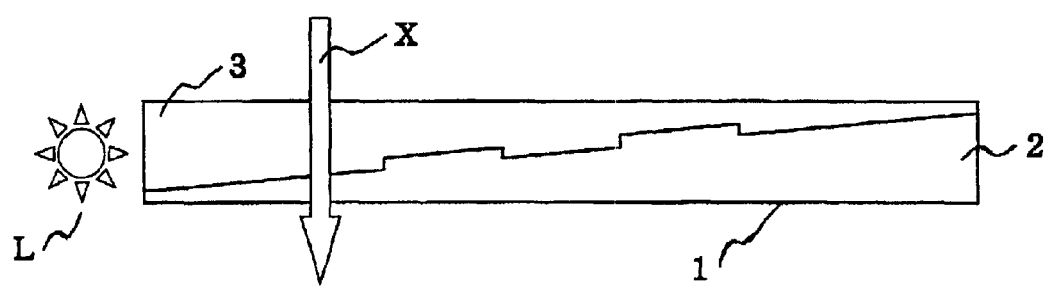
FIG. 3 is a side view of the laminated structure of the present invention, which shows a schematic drawing when a design is observed while a light source (L) is placed toward an end surface of a large-thickness portion of the layer (B) of the laminated structure according to an edge light system.

1. Laminated structure
2. Laminated structure layer (A)
3. Laminated structure layer (B)
4. A three-dimensional pattern in the laminated structure layer (A) (such a portion has a thickness that is +1 mm larger from the layer (A) surface).
   X: Direction in which observation is made (arrow mark).
   L: Light source
5. Vertical length of a laminated structure
6. Thickness of a laminated structure
7. Thickness of a laminated structure layer (B) in a gate portion
8. Thickness of a laminated structure layer (A) in a lower portion (flow end portion).
9. Length of a three-dimensional pattern
10. Thickness of a three-dimensional pattern (+1 mm larger from a layer (A) surface.
11. Position where the layers (A) and (B) of a laminated structure come to have the same thickness.
12. Thickness of the layer (A) in the above 11.
13. Fixing mold member
14. A core-side Mold member for a layer (A)
15. Hot runner forward end valve for a layer (A)
16. Hot runner flow path for a layer (A)
17. Cylinder for a layer (A)
18. Flow of a resin for a layer (A)
19. Movable mold member
20. Hot runner forward end vale for layer (B)
21. Hot runner flow path for a layer (B)
22. Cylinder for a layer (B)
23. Flow of a resin for a layer (B)
24. Core-side mold member for a layer (B)
30. Glass window for an automobile
31. Three-dimensional pattern formed in a glass window (convex-shaped in a colored layer (34))
32. Light source unit provided in a side end portion of a glass window
33. Layer forming a surface side of a glass window (outer side of an automobile) (having a hard-coating surface)
34. Layer made of a colored resin forming a reverse surface side of a glass window (inner side of an automobile)
35. LED inside a light source unit
40. Hot runner unit for molding (valve gate method)
41. Resin (PC (B)) filled in a mold cavity in a primary injection step
42. Primary injection unit (injection unit for the primary injection step)
43. Hopper of the primary injection unit
44. Screw of the primary injection unit
45. Arrow indicating the forward operation of the screw of the primary injection unit
46. Hopper of a secondary injection unit
47. Screw of the secondary injection unit
48. Secondary injection unit (injection unit for a secondary injection step)
49. Resin (PC(A)) filled in a mold cavity in the secondary injection step
50. Mold cavity for the secondary injection step
51. Core plate for compression operation of injection press-molding
52. Hydraulic cylinder for moving the entire mold
53. Hydraulic cylinder for moving the core plate 54. Two-color molding mold having a slide mechanism
55. Mold cavity for the primary injection step (FIG. 12A shows a state where a resin PC(B) is filled in the cavity).
56. Arrow mark showing the operation of backward movement of the mold (opening of the mold).
57. Molded article obtained by shaping a first layer
58. Arrow mark showing the upward sliding operation of the mold
59. Arrow mark showing the forward movement of the mold (closing of the mold)
60. Resin (PC(A)) filled in the mold cavity for the secondary injection step
61. Arrow mark showing the forward movement of the cylinder in the secondary injection step
62. Arrow mark showing the operation of a core plate (51) that presses a resin in a cavity while moving forward due to the forward movement of a cylinder (53), to attain a predetermined thickness.
70. Illuminating globe body
71. Upper half portion of an illuminating globe
72. Dotted line showing an inner wall surface of a molded article
73. Three-dimensional pattern formed in a laminate interface of the upper half portion of the globe
74. Engagement portion of upper and lower half portions of the globe
75. Lower half portion of the illuminating globe
76. Rib for installing the illuminating globe
77. Layer on a front surface side of the upper half portion of the illuminating globe
78. Layer on a reverse surface side of the upper half portion of the illuminating globe
79. Layer on a front surface side of the lower half portion of the illuminating globe
80. Layer on a reverse surface side of the lower half portion of the illuminating globe
81. Illuminating bulb
82. LED provided on a side end portion of the molded article
83. Frame for holding LED (82)
90. Box-shaped laminated structure body
91. Three-dimensional pattern formed to an interfacial portion of the laminated structure
92. Light source unit provided in a side end portion of the molded article
93. Electronic unit encased in the box-shaped container (an optical recording medium inside can be seen through from a front position)
94. Layer on the reverse surface side of the laminated structure (layer formed of PC (B) and PC (G))
95. Arrowmark showing the direction in which the molded article is observed
96. Layer on the front surface side of the laminated structure (layer formed of PC (C))
97. White LED provided in the side end portion of the molded article FIG. 1 is a schematic cross-sectional view of the sheet-shaped laminated structure of the present invention, taken at right angles with the sheet surface. FIG. 1 shows a structure having a basic and simple form intended for an explanation. The laminated structure 1 in FIG. 1 is an example that is composed of two layers (2 and 3), each of which formed of a transparent resin. In the laminated structure of FIG. 1, further, a change in the thickness of each layer is linear. In FIG. 1, the laminated structure has a character (or letter) or FIG. (4). The laminated structure of FIG. 1 includes the following embodiments 1 to 5.

Embodiment 1

The layer 2 (layer (A)) is formed of a transparent resin containing a dye or a pigment (to be sometimes abbreviated as "colorant" hereinafter), and the resin nearly uniformly contains a constant concentration of the colorant. The layer 3 (layer (B)) is formed of a transparent resin containing no colorant.

When the laminated structure of this embodiment 1 is observed in the direction indicated by an arrow mark, a change in color tone is observed depending upon the thickness of the layer 2. That is, a continuous (linear) change in color tone from a dense color to a light color takes place from an end portion of the layer 2 having a largest thickness (right hand side in FIG. 1) to an end portion having a smallest thickness (left hand side in FIG. 1).

In a character (or letter) or figure (to be sometimes abbreviated as "pattern" hereinafter) indicated by 4, the layer 2 has a locally larger thickness, so that the pattern is recognized as a pattern having a relatively dense color tone.

When this embodiment employs a fluorescent colorant as a colorant, there is obtained a laminated structure having a still more clear change in color tone.

Embodiment 2

In contrast to Embodiment 1, the resins forming the layers 2 and 3 are exchanged. That is, the layer 2 is formed of a resin containing no colorant, and the layer 3 is formed of a resin containing a colorant.

In a laminated structure of Embodiment 2, the change in color tone is similar to that in Embodiment 1, but the change in color tone from a dense color to a light color takes place in a reverse direction. However, the layer 2 containing no colorant locally has a large thickness, so that the pattern 4 is recognized a pattern having a relatively light color tone (white state).

Embodiment 3

Resins forming the layers 2 and 3 contain colorants that are different in color. For example, not only a change in color tone but also a change in color is continuously recognized from left to right depending upon colors and combinations of colorants. The following Table 1 shows some examples thereof.

TABLE 1

| Colors of colorants | Positions | | |
| --- | --- | --- | --- |
| of layers | Left end | Center | Right end |
| Layer 2 (Red) Layer 3 (Yellow) | Yellow | Orange | Red |
| Layer 2 (Red) Layer 3 (Blue) | Blue | Purple | Red |
| Layer 2 (Blue) Layer 3 (Yellow) | Yellow | Green | Blue |

While the colors of the colorants contained in the layers in the above Table 1 are combinations of three colors such as red, yellow and blue, the colors shall not be limited thereto. The combination of colors in the layers 2 and 3 may be reversed.

One of preferred embodiments of the above Embodiment 3 is a sheet-shaped laminated structure in which one layer is formed of a transparent resin containing a fluorescent dye and has a monotonous change in thickness in at least one direction of the sheet surface, and the other layer is formed of a transparent resin containing a dye or pigment having a color different from the color of the above layer.

Embodiment 4

The layer 2 is formed of a resin containing light-diffusing particles (light-diffusing agent), and the layer 3 is formed of a resin containing a colorant. A laminated structure of Embodiment 4 is semi-transparent as a whole. The transparency continuously decreases from a small-thickness portion to a large-thickness portion of the layer 2 (from left hand side to right hand side). The laminated structure of Embodiment 4 as an entire structure gives a fantasy-like (translucent-toned) image due to the function of the light-diffusing particles. The image sense thereof also changes widely depending upon the colorant.

Embodiment 5

The layer 2 is formed of a resin containing high light-reflecting particles (light-reflecting agent), and the layer 3 is formed of a resin containing a colorant. Since the layer 2 is formed of a resin containing a high light-reflecting agent, a laminated structure of Embodiment 5 is non-transparent as a whole, and the color of the colorant contained in the layer 3 exhibits an opaque color and continuously changes.

In the above Embodiments 4 and 5, when a pattern is formed in an interfacial portion of the layers 2 and 3, the pattern is emphasized, and the laminated structure exhibits a three-dimensional image. Particularly, Embodiment 5 produces a three-dimensional pattern. Further, in the above Embodiment 1 (a case using a fluorescent colorant) and Embodiments 4 and 5, the three-dimensional image of a pattern comes to be more striking or a fantasy-like image is produced depending upon the position of a light source and the kind of a colorant (a fluorescent colorant in particular) or upon the function of the light-diffusing particles or the high light-reflecting particles, as will be discussed later. In this case, a remarkably three-dimensional image or fantasy-like image is achieved when the position of the light source is not on a backlight position in the visual recognition direction but rather on an edge-light position in which the light source is positioned toward a side surface (left side or right side in FIG. 1) of the laminated structure. That is, the effect of the present invention can be more remarkably produced when light is allowed to enter in parallel with the direction in which the thickness changes.

The laminated structure of the present invention is composed of a plurality of layers, at least one layer contains a dye, a pigment or a light-diffusing agent, and a monotonous change in thickness exists at least in one direction along the sheet surface of the laminated structure, whereby a continuous change in color tone is exhibited and formed. In explanations to be given hereinafter, "colored layer" stands for a layer containing at least one of a dye, a pigment or a light-diffusing agent.

The colored layer is required to have a monotonous change in thickness, and the monotonous change in thickness refers to a continuous change in color tone which change is recognizable along the sheet surface when the laminated structure is visually observed. Therefore, desirably, the change in thickness is not stepwise but is a moderate or linear change in thickness. When a pattern such as a character (or letter) or a figure is formed, a fine convexo-concave shape is formed locally in a portion where the pattern is formed. The above convexo-concave shape on the surface for forming the pattern is excluded from the category of the monotonous change in thickness.

The mode of the monotonous change in thickness of the colored layer of the laminated structure of the present invention will be explained below. For simplification, an example of the laminated structure having a certain thickness and a rectangular form (tetragonal form whose angles are all right angles will be explained. The four corners of the rectangular form are consecutively assumed to be A, B, C and D. Then, a side A–B and a side C–D are in parallel with each other, and a side B–C and a side D–A are also in parallel with each other. Examples of the change in thickness of the colored layer will be listed below.

(i) The colored layer has a monotonous change in thickness, which change takes place in a direction from one side to other opposite side (e.g., from the side A–B to the side C–D) as shown in FIG. 1.

(ii) The colored layer has a monotonous change in thickness, which change takes place in the diagonal direction from the corner A to the corner C.

(iii) The colored layer has a monotonous change in thickness, which change takes place in the directions from the center of the rectangular form (portion where two diagonal lines come across each other) to the sides A–B, B–C, C–D and D–A (the form of a quadrangular pyramid or a reversed quadrangular pyramid).

(iv) The colored layer has a monotonous change in thickness, which change takes place in the directions from a central line (e.g., the central line in parallel with the sides A–B and C–D) to sides facing the central line (e.g., the sides A–B and C–D) (the form of a V-letter or a reversed V-letter).

(v) The colored layer has a monotonous change in thickness, which change takes place in the directions from one diagonal line taken as a central line to facing two corners (e.g., in the directions from the central line connecting the corners A and C to the corners B and C.).

The above examples (i) to (v) are given for an explanation purpose, and variants from these may be employed. For example, the central portion or the central line is not necessarily required to be exactly positioned, and may be shifted. Further, the monotonous change may be a proper combination of two or more examples of the above (i) to (v), and a portion having no change in thickness may be locally included. The laminated structure of the present invention can be any structure so long as it is in the form of a sheet, and its form shall not be limited to the above rectangular form alone. The laminated structure in the form of a sheet is in principle a laminated structure in the form of a (flat) plate, and it also includes variants obtained by deformation of such a form.

While the laminated structure of the present invention is not necessarily required to have a uniform thickness, a nearly uniform thickness is practical and preferable. Properly, the thickness is 1 to 50 mm, preferably 2 to 20 mm, particularly preferably 3 to 15 mm. The form of the laminated structure of the present invention includes a plate form, a semi-spherical form, a semi-cylindrical form, and the like. The laminated structure of the present invention may have the form of a sphere formed by combining semi-spheres, or may have the form of a cylinder. In the form of a plate, the laminated structure can have the form of a plate whose two surfaces are in parallel with each other in cross section taken at right angles with the two major surfaces. Otherwise, it can be a curved plate or a plate having curved surfaces having a curvature radius of at least 5 cm, preferably at least 15 cm, particularly preferably at least 30 cm. Further, the laminated structure may be a plate having a slight change in thickness. In any form, the laminated structure may have flat or smooth surfaces, or may have a surface or surfaces imparted with fine convexo-concave shapes for producing a light-diffusing effect. The number of layers of the laminated structure is 2 to 5, preferably 2 or 3, particularly preferably 2.

When the laminated structure is composed of two layers and when the entire laminated structure has a thickness of 1, advantageously, the change ratio of the thickness of each layer is in the range of from 0.02 to 0.98, preferably from 0.1 to 0.9.

In the laminated structure of the present invention, advantageously, each layer is formed of a transparent resin so that the entire laminated structure is transparent or semi-transparent, for allowing the laminated structure to further exhibit its fine appearance and design based on the continuous change in color tone. When a pattern such as a character (or letter) or a figure is formed, a fantasy-like or three-dimensional pattern is recognized within the surface whose color tone is continuously changed. The three-dimensional sense or clearness of the pattern can be varied depending upon the direction in which the pattern is viewed or the position of a light source. Particularly, when one layer contains a fluorescent colorant, a light-diffusing agent or a high light-reflecting agent, the light source positioned toward the side surface of the laminated structure (surface of the end portion at a right angle with the sheet surface) makes the three-dimensional sense more remarkable.

Particularly, when a fluorescent colorant or a light-diffusing agent (particularly, a fluorescent colorant) is incorporated in Embodiments 1 to 4, the sheet-shaped laminated structure of the present invention comes to show a pattern in a flat form when the light source is positioned in a backlight position, and it comes to show a pattern in a three-dimensional or fantasy-like form when the light source is positioned toward the side surface of the laminated structure. When the above phenomenon is utilized or when two light sources (backlight and edge light) are switched, the pattern can be alternately displayed in a flat form and three-dimensional form or in a flat form and a fantasy-like form.

In the laminated structure of the present invention, preferably, each layer is formed of a transparent resin, and it exhibits an excellent design when the entire laminated structure has transparency. When the entire laminated structure has transparency, desirably, the light transmittance is in the range of 10 to 90%, preferably from 20 to 70%, and advantageously, the haze is in the range of from 0.1 to 15%, preferably from 0.15 to 10%.

The thermoplastic resin for forming the laminated structure of the present invention will be explained below. In the laminated structure of the present invention, at least the colored layer is formed of a transparent resin as already described, and the resin for forming other layer(s) can be selected as required so long as the colored layer is formed of a transparent resin. Preferably, however, all the layers are formed of relatively transparent resin(s). Further, a plurality of layers to be laminated may be formed of one resin or different resins. Forming the layers from one resin is preferred in view of processability, physical properties and use.

The above transparent resin includes those resins that give a surface-smooth, 2 mm thick plate-shaped molded article having a total light transmittance, measured according to JIS K7105, of at least 10%, preferably at least 20%, more preferably at least 30%.

In the transparent resin containing a dye or a pigment, the content of the dye or the pigment per 100 parts by weight of the thermoplastic resin is preferably 0.001 to 2 parts by weight, more preferably 0.005 to 1 part by weight, still more preferably 0.005 to 0.5 part by weight.

In the transparent resin that contains a fluorescent colorant and exhibits a highly elaborated design, the content of the fluorescent colorant per 100 parts by weight of the thermoplastic resin is preferably 0.001 to 2 parts by weight, more preferably 0.005% part by weight, still more preferably 0.005 to 0.5 part by weight.

The transparent resin containing a light-diffusing agent is preferably selected from those that give a surface-smooth, 2 mm thick plate-shaped molded article having a total light transmittance, measured according to JIS K7105, of at least 10 to 93% and a haze of 20 to 90%. The total light transmittance is more preferably 30 to 90%, particularly preferably 50 to 90%, and the haze is more preferably 30 to 90%.

The resin containing a high light-reflecting agent is preferably selected from those that give a surface-smooth, 2 mm thick plate-shaped molded article having a total light reflectance, at a wavelength of 450 to 800 nm, of at least 80%, preferably at least 90%, more preferably at least 95%.

Examples of the thermoplastic resin for use for the laminated structure of the present invention include general-purpose plastics typified by a polyethylene resin, a polypropylene resin, a polystyrene resin, a high-impact polystyrene resin, a hydrogenated polystyrene resin, a polyacrylstyrene resin, an ABS resin, an AS resin, an AES resin, an ASA resin, an SMA resin and a polyalkyl methacrylate resin, engineering plastics typified by a polyphenylene ether resin, a polyacetal resin, a polycarbonate resin, a polyalkylene terephthalate resin, a polyamide resin, poly-4-methylpentene-1 (TPX resin), a fluorine resin, a phenoxy resin, a cyclopolyolefin resin and apolyarylate resin (amorphous polyarylate and liquid-crystalline polyarylate), and so-called super engineering plastics such as polyether ether ketone, various thermoplastic polyimides typified by polyetherimide and polyamideimide, polysulfone, polyethersulfone and polyphenylene sulfide. Further, there maybe used a polystyrene-containing thermoplastic elastomer, an polyolefin-containing thermoplastic elastomer, a polyamide-containing thermoplastic elastomer, a polyester-containing thermoplastic elastomer, a polyurethane-containing thermoplastic elastomer, and the like.

The above thermoplastic resins may be used as a mixture as required depending upon a purpose in use of a composition.

In the present invention, at least one layer is required to have transparency, and preferably, any one of the layers is formed of a transparent thermoplastic resin. The transparent thermoplastic resin includes a polystyrene resin, a high-impact polystyrene resin, a hydrogenated polystyrene resin, a polyacrylstyrene resin, an ABS resin, an AS resin, an AES resin, an ASA resin, an SMA resin, a polyalkyl methacrylate resin, a polyphenylene ether resin, a polycarbonate resin, an amorphous polyalkylene terephthalate resin, an amorphous polyamide resin, poly-4-methylpentene-1, a cyclopolyolefin resin, an amorphous polyarylate resin, polyethersulfone, and further, thermoplastic elastomers such as a polystyrene-containing elastomer, a polyolefin-containing thermoplastic elastomer, a polyamide-containing thermoplastic elastomer, a polyester-containing thermoplastic elastomer, a polyurethane-containing thermoplastic elastomer, and the like.

Of these, preferred are a polyalkyl methacrylate resin such as polymethyl methacrylate, a polycarbonate resin, a cyclopolyolefin resin, an amorphous polyarylate resin, which are excellent in transparency.

The alkylmethacrylate resin includes a resin containing methyl methacrylate as a main component unit. A copolymer with an alkyl acrylate is generally used, while there may be used a copolymer containing, as other copolymer component, an acrylimide component unit or a methylcylcohexyl methacrylate unit for improving heat resistance. Further, a copolymer formed by copolymerization with α-methylstyrene may be also used.

The cyclopolyolefin resin includes APO resin supplied by Mitsui Chemical Inc., Arton supplied by JSR Corporation, Zeonex and Zeonor supplied by ZEON CORPORATION, and a hydrogenated α-olefin-dicyclopentadiene copolymer.

Preferably, at least one layer of layers constituting the laminated structure of the present invention is formed of a polycarbonate resin, in view of mechanical strength and heat resistance of the laminated structure. Most preferably, all the layers of the laminated structure are formed of a polycarbonate resin.

The polycarbonate resin will be specifically explained below. Generally, the polycarbonate resin refers to a resin obtained from a dihydric phenol and a carbonate precursor by an interfacial polymerization method or a melt-polymerization method, and it also refers to a resin obtained by polymerizing a carbonate prepolymer by a solid-phase ester exchange method or a resin obtained from a cyclic carbonate compound by a ring-opening polymerization method.

Typical examples of the above dihydric phenol include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (so-called bisphenol A), 2,2-bis{(4-hydroxy-3-methyl)phenyl}propane, 2,2-bis{(4-hydroxy-3,5-dimethyl)phenyl}propane, 2,2-bis{(3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenylsulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether and 4,4'-dihydroxydiphenyl ester. These compounds may be used alone or in combination.

Of these, preferred is a homopolymer or copolymer obtained from at least one bisphenol selected from the group consisting of bisphenol A, 2,2-bis{(4-hydroxy-3-methy)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane, and α,α'-bis(4-hydroxyphenyl)-m-diisopropylbenzene. Particularly preferred are a homopolymer of bisphenol A and a copolymer from 1,1-bis(4-hydroxyphenyl)-3,3,5-trimethylcyclohexane and bisphenol A, 2,2-bis{(4-hydroxy-3-methyl)phenyl}propane or α,α'-bis(4-hydroxyphenyl)-m-diisopropylbenzene. A homopolymer of bisphenol A is the most preferred.

The above carbonate precursor is selected from carbonyl halide, carbonate ester, haloformate, or the like, and specifically, it includes phosgene, diphenyl carbonate and dihaloformate of dihydric phenol.

When the above dihydric phenol and the carbonate precursor are reacted according to an interfacial polymerization method or a melt-polymerization method to produce a polycarbonate resin, a catalyst, a terminal stopper and an antioxidant for preventing oxidation of the dihydric phenol may be used as required. Further, the polycarbonate resin may be a branched polycarbonate resin obtained by copolymerizing a polyfunctional aromatic compound having three or more functional groups or a polyester carbonate resin obtained by copolymerizing an aromatic or aliphatic difunctional carboxylic acid. Further, the polycarbonate resin may be a mixture of two or more polycarbonate resins that are obtained above.

The polyfunctional aromatic compounds having three or more functional groups includes fluoroglucin, fluoroglucide, trisphenols such as 4,6-dimethyl-2,4,6-tris(4-hydroxyphenyl)heptene-2, 2,4,6-trimethyl-2,4,6-tris(4-hydroxyphenyl)heptene, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-(4-[1,1-bis(4-hydroxyphenyl)ethyl]benzene-α,α-dimethyl benzylphenol, tetra(4-hydroxyphenyl)methane, bis(2,4-dihydroxyphenyl)ketone, 1,4-bis(4,4-dihydroxytriphenylmethyl)benzene, trimellitic acid, pyromellitic acid, benzophenonetetracarboxylic acid and acid chlorides of trimellitic acid, pyromellitic acid, benzophenonetetracarboxylic acid. Of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

When the polyfunctional compound that generates the above branched polycarbonate resin is contained, the content of such a component based on the entire aromatic polycarbonate amount is 0.001 to 1 mol %, preferably 0.005 to 0.5 mol %, particularly preferably 0.01 to 0.3 mol %. In a melt-polymerization method in particular, a branch structure is sometimes formed as a side reaction. The content of such a branched structure based on the entire aromatic polycarbonate amount is 0.001 to 1 mol %, preferably 0.005 to 0.5 mol %, particularly preferably 0.01 to 0.3 mol %. The above contents can be calculated on the basis of $^1$H-NMR measurement.

The reaction according to an interfacial polymerization method is generally a reaction between a dihydric phenol and phosgene, and the reaction is carried out in the presence of an acid binder and an organic solvent. The acid binder can be selected, for example, from alkali metal hydroxides such as sodium hydroxide and potassium hydroxide and amine compounds such as pyridine. The organic solvent can be selected, for example, from hydrocarbon halides such as methylene chloride and chlorobenzene. For promoting the reaction, for example, there may be used a catalyst selected from tertiary amines, quaternary ammonium compounds and quaternary phosphonium compounds such as triethylamine, tetra-n-butylammonium bromide and tetra-n-butylphosphonium bromide. In this case, preferably, the reaction temperature is generally 0 to 40° C., the reaction time period is approximately 10 minutes to 5 hours, and the pH of a reaction mixture during the reaction is maintained at 9 or more.

In the above polymerization, generally, a terminal stopper is used. The terminal stopper can be selected from monofunctional phenols. Monofunctional phenols are generally used as a terminal stopper for adjusting a molecular weight, and an obtained polycarbonate resin has terminals blocked with the monofunctional phenols and therefore has excellent thermal stability over any other resin that is not so blocked. The above monofunctional phenol is generally phenol or a lower-alkyl-substituted phenol, and includes monofunctional phenols of the following general formula (1).

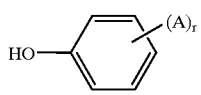
(1)

wherein A is a hydrogen atom or a linear or branched alkyl or phenyl-substituted alkyl group having 1 to 9 carbon atoms, and r is an integer of 1 to 5, preferably 1 to 3.

Specific examples of the above monofunctional phenols include phenol, p-tert-butylphenol, p-cumylphenol and isooctylphenol.

Further, as other monofunctional phenols, phenols having a long-chain alkyl group or an aliphatic polyester group as a substituent, benzoic acid chlorides or long-chain alkyl carboxylic acid chlorides may be also employed. Of these, phenols having a long-chain alkyl group as a substituent, represented by the following general formulae (2) and (3), are preferred.

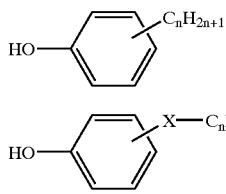
(2)

(3)

wherein X is —R—CO—O— or —R—O—CO—, in which R is a single bond or a divalent aliphatic hydrocarbon group having 1 to 10 carbon atoms, preferably 1 to 5 carbon atoms, and n is an integer of 10 to 50.

In the substituted phenol of the above general formula (2), n is preferably 10 to 30, particularly preferably 10 to 26. Specific examples of such phenols include decylphenol, dodecylphenol, tetradecylphenol, hexadecylphenol, octadecylphenol, eicosylphenol, docosylphenol and triacontylphenol.

In the substituted phenol of the general formula (3), properly, X is —R—CO—O— and R is a single bond, and preferably n is 10 to 30, particularly preferably n is 10 to 26. Specific examples of such compounds include decyl hydroxybenzoate, dodecyl hydroxybenzoate, tetradecyl hydroxybenzoate, hexadecyl hydroxybenzoate, eicosyl hydroxybenzoate, docosyl hydroxybenzoate and triacontyl hydroxybenzoate.

Desirably, the amount of the introduced terminal stopper on the basis of the total terminal amount of the obtained polycarbonate resin is at least 5 mol %, preferably at least 10 mol %. More preferably, the terminal stopper is introduced in an amount of at least 80 mol % based on the total terminal amount, that is, the amount of hydroxyl groups (OH groups) derived from the dihydric phenols is 20 mol % or less. Particularly preferably, the terminal stopper is introduced in an amount of at least 90 mol % based on the total terminal amount, that is, the amount of OH groups is 10 mol % or less. The foregoing terminal stoppers may be used alone or in combination.

The reaction according to a melt-polymerization method is generally an ester exchange reaction between a dihydric phenol and a carbonate ester, and is carried out by a method in which the dihydric phenol and the carbonate ester are mixed under heat in the presence of an inert gas and formed alcohol or phenol is distilled off. Although differing depending upon the boiling point of the formed alcohol or phenol, the reaction temperature is generally in the range of from 120 to 350° C. In the later stage of the reaction, the reaction system is pressure-reduced to approximately $1.33 \times 10^3$ to 13.3 Pa to easily distill off the formed alcohol or phenol. The reaction time period is generally approximately 1 to 4 hours.

The carbonate ester includes esters of an optionally substituted aryl group having 6 to 10 carbon atoms, an aralkyl group or alkyl group having 1 to 4 carbon atoms. Specific examples of the carbonate ester include diphenyl carbonate, bis(chlorophenyl) carbonate, dinaphthyl carbonate, bis (diphenyl) carbonate, dimethyl carbonate, diethyl carbonate and dibutyl carbonate. Of these, diphenyl carbonate is preferred.

For increasing the polymerization rate, a polymerization catalyst may be used. The polymerization catalyst can be selected from catalysts that are generally used for esterification reactions or ester exchange reactions, and examples of the polymerization catalyst include alkali metal compounds such as sodium hydroxide, potassium hydroxide and sodium salt or potassium salt of dihydric phenol, alkaline earth metal compounds such as calcium hydroxide, barium hydroxide and magnesium hydroxide, nitrogen-containing basic compounds such as tetramethylammonium hydroxide, tetraethylammonium hydroxide, trimethylamine and triethylamine, alkoxides of alkali metals or alkaline earth metals, organic acid salts of alkali metals or alkaline earth metals, zinc compounds, boron compounds, aluminum compounds, silicon compounds, germanium compounds, organotin compounds, lead compounds, osmium compounds, antimony compounds, manganese compounds, titanium compounds and zirconium compounds. The above catalysts may be used alone or in combination. The amount of the polymerization catalyst per mole of the dihydric phenol as a raw material is preferably in the range of from $1 \times 10^{-8}$ to $1 \times 10^{-3}$ equivalent weight, more preferably $1 \times 10^{-7}$ to $5 \times 10^{-4}$ equivalent weight.

In the above polymerization, it is preferred to add a compound selected from the following compounds in a later stage of, or after, the polycondensation, for decreasing phenolic terminals. The compounds include bis (chlorophenyl) carbonate, bis(bromophenyl) carbonate, bis (nitrophenyl) carbonate, bis (phenylphenyl) carbonate, chlorophenylphenyl carbonate, bromophenylphenyl carbonate, nitrophenylphenyl carbonate, phenylphenyl carbonate, methoxycarbonylphenylphenyl carbonate and ethoxycarbonylphenylphenyl carbonate. Of these, 2-chlorophenylphenyl carbonate, 2-methoxycarbonylphenylphenyl carbonate and 2-ethoxycarbonylphenylphenyl carbonate are preferred, and 2-methoxycarbonylphenylphenyl carbonate is particularly preferred.

Further, in the melt-polymerization method, desirably, a deactivator is used to neutralize the activity of the catalyst that remains after the polymerization. The deactivator includes benzenesulfonic acid, p-toluenesulfonic acid, sulfonic acid esters such as methyl benzenesulfonate, ethyl benzenesulfonate, butyl benzenesulfonate, octyl benzenesulfonate, phenyl benzenesulfonate, metyl p-toluenesulfonate, ethyl p-toluenesulfonate, butyl p-toluenesulfonate, octyl p-toluenesulfonate and phenyl p-toluenesulfonate; and compounds such as trifluoromethanesulfonic acid, naphthalenesulfonic acid, sulfonated polystyrene, a methylacrylate-sulfonated styrene copolymer, 2-phenyl-2-propyl dodecylbenzenesulfonate, 2-phenyl-2-butyl dodecylbenzenesulfonate, octylsulfonic acid tetrabutylphosphonium salt, decylsulfonic acid tetrabutylphosphonium salt, benzenesulfonic acid tetrabutylphosphonium salt, dodecylbenzenesulfonic acid tetraethylphosphonium salt, dodecylbenzenesulfonic acid tetrabutylphosphonium salt, dodecylbenzenesulfonic acid tetrahexylphosphonium salt, dodecylbenzenesulfonic acid tetraoctylphosphonium salt, decylammonium butylsulfate, decylammonium decylsulfate, dodecylammonium methylsulfate, dodecylammonium ethylsulfate, dodecylmethylammonium methylsulfate, dodecyldimethylammonium tetradecylsulfate, tetradecyldimethylammonium methylsulfate, tetramethylammonium hexylsulfate, decyltrimethylammonium hexadecylsulfate, tetrabutylammonium dodecylbenzylsulfate, tetraethylammonium dodecylbenzylsulfate and tetramethylammonium dodecylbenzylsulfate. The deactivator shall not be limited to these compounds, and these compounds may be also used in combination.

Of these, phosphonium salt compounds or ammonium salt compounds are preferred. The amount of the deactivator is preferably 0.5 to 50 mol per mole of the remaining catalyst. The amount of the deactivator that is used based on the polycarbonate resin obtained is 0.01 to 500 ppm, more preferably 0.01 to 300 ppm, particularly preferably 0.01 to 100 ppm.

While the molecular weight of the polycarbonate resin is not specially limited, high-temperature properties thereof decrease when the viscosity-average molecular weight is less than 10,000, and moldability thereof decreases when the viscosity average molecular weight thereof exceeds 40,000. The molecular weight of the polycarbonate resin, represented by a viscosity average molecular weight, is preferably 10,000 to 40,000, particularly preferably 14,000 to 30,000. Further, two or more polycarbonate resins may be mixed. In this case, a polycarbonate resin having a viscosity average molecular weight outside the above range can be naturally used for preparing a mixture.

A mixture containing a polycarbonate resin having a viscosity average molecular weight of over 40,000 exhibits excellent effects on draw-down performances important for blow molding, drip prevention performances for improving flame retardancy and meltability-improving performances for preventing jetting during injection molding. Such a polycarbonate can be used as required depending upon these purposes. More preferably, the mixture contains a polycarbonate resin having a viscosity average molecular weight of 80,000 or more, and still more preferably, it contains a polycarbonate resin having a viscosity average molecular weight of 100,000 or more. That is, it is preferred to use a mixture that shows a molecular weight distribution having two or more peaks when the mixture is measured by GPC (gel permeation chromatography).

The viscosity average molecular weight that the present invention refers to is determined by incorporating a specific viscosity ($\eta_{sp}$) determined from a solution of 0.7 g of a polycarbonate resin in 100 ml of methylene chloride at 20° C. into the following equation.

$\eta_{sp}/c=[\eta]+0.45\times[\eta]^2 c$ (in which [$\eta$] stands for an intrinsic viscosity.)

$[\eta]=1.23\times 10^{-4} M^{0.83}$ $c=0.7$

The thermoplastic resin in the present invention may contain a mold release agent. The mold release agent incorporated gives a desirable result in that a distortion during removal from a mold can be prevented. Generally, the mold release agent includes saturated fatty acid esters. The mold release agent can be selected, for example, from monoglycerides such as stearic acid monoglyceride, diglycerides, triglycerides such as stearic acid triglyceride, polyglycerin fatty acid esters such as decaglycerin decastearate and decaglycerin tetrastearate, lower fatty acid esters such as stearic acid stearate, higher fatty acid esters such as sebacic acid behenate, and erythritol esters such as pentaerythritol tetrastearate. An organosiloxane compound having an aromatic group can be preferably used since it serves to attain good transparency of a composition and has excellent heat resistance. The amount of the mold release agent per 100 parts by weight of the thermoplastic resin is 0.01 to 1 part by weight.

The thermoplastic resin in the present invention may contain a phosphorus-containing heat stabilizer as required. The phosphorus-containing heat stabilizer is preferably selected from phosphate compounds and phosphate compounds. Examples of the phosphite compounds include triphenyl phosphate, trisnonylphenyl phosphite, tris(2,4-di-tert-butylphenyl) phosphite, tridecylphosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl) pentaerythritol diphosphite, 2,2-methylenebis(4,6-di-tert-butylphenyl)octyl phosphite, bis(nonylphenyl) pentaerythritol diphosphite and bis(2,4-di-tert-butylphenyl) pentaerythritol diphosphite. Of these, tris(2,4-di-tert-butylphenyl) phosphite, distearylpentaerythritol diphosphite and bis(2,4-di-tert-butylphenyl)pentaerythritol diphosphite are preferred.

Examples of the phosphate compounds used as a heat stabilizer include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Of these, triphenyl phosphate and trimethyl phosphate are preferred.

Further, the phosphorus-containing heat stabilizer can be also preferably selected from phosphonite compounds such as tetrakis(2,4-di-tert-butylphenyl)-4,4'-biphenylenediphosphonite, tetrakis(2,4-di-tert-butylphenyl)-4,3'-biphenylenediphosphonite, tetrakis(2,4-di-tert-butylphenyl)-3,3'-biphenylenediphosphonite and bis (2,4-di-tert-butylphenyl)-4-biphenylenephosphonite.

The above phosphorus-containing heat stabilizers may be used alone or in combination. Properly, the amount of the phosphorus-containing heat stabilizer per 100 parts by weight of the thermoplastic resin is in the range of from 0.0001 to 0.5 part by weight, preferably from 0.001 to 0.05 part by weight.

The thermoplastic resin may contain a generally known anti-oxidant for preventing oxidation, and can be selected, for example, from phenol anti-oxidants. Specific examples of the anti-oxidant include triethylene glycol-bis(3-(3-tert-butyl-5-methyl-4-hydroxyphenyl) propionate), 1,6-hexanediol-bis(3-(3,5-di-tert-butyl-4-hydroxyphenyl) propionate),-pentaerythritol-tetrakis(3-(3,5-di-tert-butyl-4-hydroxyphenyl)propionate), octadecyl-3-(3,5-di-tert-butyl-4-hydroxyphenyl)-propionate, 1,3,5-trimethyl-2,4,6-tris(3, 5-di-tert-butyl-4-hydroxybenzyl)benzene, N,N-hexamethylenebis(3,5-di-tert-butyl-4-hydroxyhydrocinnamide), 3,5-di-tert-butyl-4-hydroxybenzylphosphonate-diethyl ester, tris(3,5-di-tert-butyl-4-hydroxybenzyl)isocyanurate and 3,9-bis{1,1-dimethyl-2-[β-(3-tert-butyl-4-hydroxy-5-methylphenyl)propionyloxy]ethyl}-2,4,8,10-tetraoxaspiro (5,5)undecane.

The amount of the anti-oxidant per 100 parts by weight of the thermoplastic resin is in the range of from 0.0001 to 5 parts by weight, preferably from 0.001 to 0.5 part by weight.

The thermoplastic resin may further contain an ultraviolet absorbent and a light stabilizer for improving weatherability and cutting harmful ultraviolet ray. Examples of the ultraviolet absorbent include benzophenone ultraviolet absorbents typified by 2,2'-dihydroxy-4-methoxybenzophenone and benzotriazole ultraviolet absorbents typified by 2-(3-tert-butyl-5-methyl-2-hydroxyphenyl)-5-chlorobenzotriazole, 2-(3,5-di-tert-butyl-2-hydroxyphenyl)-5-chlorobenzotriazole, 2,2'-methylenebis[4-(1,1,3,3-tetramethylbutyl)-6-(2H-benzotriazol-2-yl)phenol], 2-[2-hydroxy-3,5-bis($\alpha,\alpha$-dimethylbenzyl)phenyl]-2H-benzotriazole and 2-(3,5-di-tert-amyl-2-hydroxyphenyl)benzotriazole. Further, the ultraviolet absorbent preferably includes, for example, hydroxyphenyltriazine compounds such as 2-(4,6-diphenyl-1,3,5-triazine-2-yl)-5-hexyloxyphenol and 2-[4,6-bis(2,4-dimethylphenyl)-1,3,5-triazine-2-yl]-5-hexyloxyphenol. Further, hindered amine light stabilizers such as bis(2,2,6,6-tetramethyl-4-piperidyl)sebacate and bis(1,2,2,6,6-pentamethyl-4-piperidyl)sebacate can be also used. The above compounds may be used alone or in combination. The amount of the above ultraviolet absorbent or light stabilizer per 100 parts by weight of the thermoplastic resin is in the range of from 0.0001to 10 parts by weight, preferably from 0.001 to 5 parts by weight.

Further, the thermoplastic resin having transparency in the present invention may contain a bluing agent for offsetting a yellowish color caused by an ultraviolet absorbent or the like. The bluing agent is useful particularly for the polycarbonate resin. Specific examples of the bluing agent include Common name Solvent Violet 13 [CA. No. (Color index No.) 60725; trade names "Macrolex Violet B" supplied by Bayer AG, "Diaresin Blue G" supplied by Mitsubishi Chemical Corporation, and "Sumiplast Violet B" supplied by Sumitomo Chemical Co., Ltd.], Common name Solvent Violet 31 [CA. No. 68210; trade name; "Diaresin Violet D" supplied by Mitsubishi Chemical Corporation.], Common name Solvent Violet 33 [CA. No. 60725; trade name; "Diaresin Blue J", supplied by Mitsubishi Chemical Corporation.], Common name Solvent Blue 94 [CA. No. 61500; trade name; "Diaresin Blue N" supplied by Mitsubishi Chemical Co., Ltd.], Common name Solvent Violet 36 [CA. No. 68210; trade name; "Macrolex Violet 3R" supplied by Bayer AG], Commonname Solvent Blue 97 [tradename "Macrolex Violet RR" supplied by Bayer AG], Common name Solvent Blue 87 [trade name "Plast Blue 8580", supplied by Arimoto Chemical Co., Ltd.], Common name Solvent Blue 45 [CA. No. 61110; trade name "Telasol Blue RLS" supplied by Sandoz Ltd.], and Macrolex Violet or Telasol Blue RLS supplied by Ciba Specialty Chemicals K.K. Macrolex Violet, Telasol Blue RLS, Macrolex Blue RR and Plast Blue 8580 are particular preferred.

The thermoplastic resin may further contain other conventional additives such as a reinforcing agent (talc, mica, clay, wollastonite, calcium carbonate, glass fibers, glass beads, glass balloons, milled fibers, glass flakes, carbon fibers, carbon flakes, carbon beads, carbon milled fibers, metal flakes, metal fibers, metal-coated glass fibers, metal-coated carbon fibers, metal-coated glass flakes, silica, ceramic particles, ceramic fibers, aramid fibers, polyallylate fibers, graphite, electrically conductive carbon black, various whiskers, etc.), a flame retardant (halogen-containing, phosphoric ester-containing, metal salt-containing, red phosphorus, silicone-containing, fluorine-containing and metal hydrate-containing flame retardants, etc.), a heat-resisting agent, a fluorescent brightener, an antistatic agent, a flowability improving agent, inorganic and organic antiseptics, a photocatalyst-based antifouling agent (fine particles of titanium oxide, fine particles of zinc oxide, etc.), an impact modifier typified by graft rubber, an infrared absorbent typified by a phthalocyanine compound or carbon black, and a photochromic agent.

Of these, a glass-based filler that serves to maintain transparency by decreasing a refractive index difference from the refractive index of a resin is particularly preferred, and such glass-based fillers are well known. In the glass-based filler, the difference from the refractive index of a resin is preferably 0.015 or less, preferably 0.010 or less. When such a filler is used, there can be obtained a sheet-shaped laminated structure that not only has high transparency but also has high rigidity and high strength.

Further, the thermoplastic resin in the present invention may contain a resin from a product or a molded resin in the form of a product, a so-called recycled material. Such a recycled material often has a coating for coloring, various functional coatings for wear resistance, anti-static properties and heat absorption, and laminated films such as metal films formed by vapor deposition, sputtering and plating. Such a recycled material can be used while it has the above coating(s) and film(s) or after all or part of the above coating(s) and film(s) are removed.

When optical information recording media (CD, DVD, MD, etc.) having a substrate formed, for example, of a polycarbonate resin are used as a recycled material, these materials can be pulverized or processed in some other way and directly used, or such a pulverized material is mixed with other thermoplastic resin material and/or other recycled material of a thermoplastic resin material and can be used in the form of a mixture.

On the other hand, an information recording layer can be selectively removed from such an optical recording medium, a reflection layer and a protective layer can be removed from a substrate made of a resin, and the resin itself can be recovered and used. Any method that has been proposed as a method for the above removal can be employed.

The dye, the pigment, the light-diffusing agent and the high light-reflecting agent that are incorporated into at least one layer constituting the laminated structure of the present invention will be explained below. These can be selected from colorants or additives that are known for use in resins, and they are selected depending upon the kind of a resin, dispersibility thereof in a resin and processing temperatures, so that a desired color can be determined. A combination of two or more colorants can be used.

The agent for coloring includes organic colorants such as a perylene dye, a coumarin dye, a thioindigo dye, an anthraquinone dye, a thioxanthone dye, ferrocyanides such as Prussian blue, a perinone dye, a quinoline dye, a quinacridone dye, dioxazine dye, an isoindolenone dye and a phthalocyanine dye and carbon black. Of these, for transparency organic colorants are preferred. Further, an anthraquinone dye, a perinone dye, a quinoline dye, a perylene dye, a coumarin dye and a thioindigo dye are more preferred.

Specific examples of the dye include anthraquinone dyes that are known as CI Solvent Red 52, CI Solvent Red 149, CI Solvent Red 150, CI Solvent Red 191, CI Solvent Red 151, CI Solvent Red 135, CI Solvent Red 168, CI Disperse Red 22, CI solvent Blue 94, CI Solvent Blue 97, CI Solvent Blue 87, CI Solvent Violet 13, CI Solvent Violet 14, CI Disperse Violet 28, CI Solvent Green 3 and CI Solvent Green 28, quinoline dyes such as CI Solvent Yellow 33, CI Solvent Yellow 157, CI Disperse Yellow 54 and CI Disperse Yellow 160, and perinone dyes such as CI Solvent Red 135, CI Solvent Red 179 and CI Solvent Orange 60. These can be used alone or in combination, and can be used for coloring as required.

A fluorescent colorant may be used, and examples thereof include a fluorescent dye and fluorescent organic pigments such as a phthalocyanine complex and a naphthalocyanine complex.

Various fluorescent dyes can be used as such. Examples of the fluorescent dyes include a perylene fluorescent dye, a coumarin fluorescent dye, a benzopyran fluorescent dye, an anthraquinone fluorescent dye, a thioindigo fluorescent dye, a xanthene fluorescent dye, a xanthone fluorescent dye, a xanthene fluorescent dye, a thioxanthone fluorescent dye, a thiazine fluorescent dye and a diaminostilbene fluorescent dye.

In view of fluorescence durability (weatherability), it is preferred to incorporate at least 5% by weight, per 100% by weight of the total amount of fluorescent dyes, of a perylene fluorescent dye, a coumarin fluorescent dye and a benzopyran fluorescent dye of these.

Various coumarin dyes can be used as such, and specific examples thereof include MACROLEX Fluorescent Yellow 10GN (CI Solvent Yellow 160:1) and MACROLEX Fluorescent Red G, which are supplied by Bayer AG.

Various benzopyran fluorescent dyes can be used as such, and specific examples thereof include Red BK and Red GK of Fluorol series supplied by BASF.

Various perylene fluorescent dyes can be used as such, and specific examples thereof include CI Vat Red 15, CI Vat Orange 7 and CI Solvent Green 5 and further include F Orange 240, F Red 300, F Yellow 083, F Red 339 and F Violet 570 of LUMOGEN series supplied by BASF.

Of the above fluorescent dyes, it is particularly preferred to incorporate at least 5% by weight, per 100% by weight of the total amount of fluorescent dyes, of a perylene fluorescent dye.

Specific examples of the fluorescent dye other than the perylene fluorescent dye, the coumarin fluorescent dye and the benzopyran fluorescent dye are as follows.

The anthraquinone dye includes pyranthrone anthraquinone dyes known as CI Vat Orange 9, CI Vat Orange 2 and CI Vat Orange 4, dibenzanthrone anthraquinone dyes known as CI Vat Blue 20, CI Vat Blue 19, CI Vat Blue 22, CI Vat Green 4 and CI Vat Green 12, isodibenzanthrone anthraquinone dyes known as CI Vat Violet 1, CI Vat Violet 9, CI Vat Violet 10 and CI Vat Green 1, and dibenzopyrenequinone anthraquinone dyes known as CI Vat Orange 1 and CI Vat Yellow 4. Further, the anthraquinone dye also includes CI Vat Blue 6 and CI Vat Violet 13.

The thioindigo dye includes CI Vat Red 1, CI Vat Red 2, CI Vat Red 41, CI Vat Red 47, CI Vat Violet 2 and CI Vat Violet 3.

The fluorescent organic pigment includes phthalocyanine organic pigments such as CI PIGMENT GREEN 7 and CI PIGMENT BLUE 15:3 and naphthalocyanine organic pigments.

As a light-diffusing agent for use in the present invention, any known light-diffusing agent in the form of inorganic fine particles or polymer fine particles can be used. The form of the light-diffusing agent is not specially limited, and the light-diffusing agent can be in any form of particles, spheres, plates, hollow materials, needles, spindles, or the like. The light-diffusing agent preferably has an average particle diameter of 0.01 to 50 $\mu$m. The average particle diameter of the light-diffusing agent is more preferably 0.1 to 10 $\mu$am, still more preferably 0.1 to 8 $\mu$m. Further, the light-diffusing agent preferably has a narrow particle diameter distribution, and it more preferably has a distribution in which at least 70% of particles have diameters within ±2 $\mu$m of an average particle diameter.

In the light-diffusing agent, preferably, the absolute value of a difference between the refractive index of the light-diffusing agent and the refractive index of a matrix resin is 0.02 to 0.2. That is because the light-diffusing agent, if used, is required to compatibilize its light-diffusing properties and its light transmittance at high levels. In view of transparency, preferably, the refractive index of the light-diffusing agent is lower than the refractive index of a matrix resin.

Examples of the inorganic fine particles include barium sulfate, calcium carbonate, silica, alumina, magnesia, mica, talc, aluminum hydroxide, titanium oxide, lithium fluoride, calcium fluoride, magnesium sulfate, magnesium carbonate, magnesium oxide, zinc oxide, zirconium oxide, cerium oxide, milled glass, glass milled fibers, glass beads, very thin glass flakes, glass balloons, alumina balloons and calcium silicate. These particles may be surface-coated with a compound different from a substance forming the particles.

The polymer fine particles in the present invention include organic crosslinked particles obtained by polymerization of a non-crosslinking monomer and a crosslinking monomer. Then on crosslinking monomer includes an acrylic monomer, a styrene monomer, an acrylonitrile monomer and an olefin monomer. These may be used alone or in combination. Further, other copolymerizable monomer different from the above monomers may be used. Silicone-based crosslinked particles may be used as other organic crosslinked particles.

The polymer fine particles in the present invention also include heat-resistant polymer particles such as polyether sulfone particles. That is, no crosslinking monomer is required so long as the form of fine particles is not impaired in a state where a matrix resin is in a molten state under heat.

Further, the polymer fine particles can be selected from thermosetting resins such as various epoxy resin particles, urethane resin particles, benzoguanamine resin particles and phenolic resin particles.

As a light-diffusing agent, organic crosslinked particles are more preferred. Such particles highly permit control of the diameter and form of particles and make it possible to control light-diffusing properties to a higher degree. Further, the above particles have an advantage that thermal discoloration hardly occurs during molding at high temperatures when a polycarbonate resin is used as a matrix resin.

The acrylic monomer for the above organic crosslinked particles includes methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, phenyl methacrylate, and the like. These monomers may be used alone or in combination. Of these, methyl methacrylate is particularly preferred.

The styrene monomer includes styrene, alkylstyrenes such as α-methylstyrene, methylstyrene (vinyltoluene) and ethylstyrene, and halogenated styrenes such as brominated styrene. Of these, styrene is particularly preferred. The acrylonitrile monomer includes acrylonitrile and methacrylonitrile. The olefin monomer includes ethylene and various norbornene-type compounds. Further, the other copolymerizable monomer includes glycidyl methacrylate, N-methyl maleimide and maleic anhydride, and a polymer as end fine particles may contain units of N-methylglutarimide, or the like.

Examples of the crosslinking monomer as a comonomer to be polymerized with the above vinyl non-crosslinking monomer include divinylbenzene, allyl methacrylate, triallyl cyanurate, triallyl isocyanate, ethylene glycol di(meth) acrylate, diethylene glycol di(meth)acrylate, propylene glycol (meth)acrylate, 1,6-hexanediol di(meth)acrylate, trimethylolpropane (meth)acrylate, pentaerythritol tetra(meth)acrylate, bisphenol A di(meth)acrylate, dicyclopentanyl di(meth)acrylate, dicyclopentenyl di(meth)acrylate and N-methylol (meth)acrylamide.

The method for producing the organic crosslinked particles from an acrylic monomer, etc., includes a general emulsion polymerization method, and also includes a soap-free polymerization method using potassium persulfate, etc., as an initiator, a seed polymerization method and a two-stage swelling polymerization method. Further, a suspension polymerization method may be used, in which an aqueous phase and a monomer phase are separately held and these two phases are accurately fed to a continuous-method dispersing machine to control the diameter of particles on the basis of the number of rotation of the dispersing machine. There may be also employed a similar continuous-method production method, in which the monomer phase is fed to an aqueous liquid having dispersing capability through fine-diameter orifices or porous filters having an opening diameter of several to tens μm each, to control the diameter of particles.

The silicone crosslinked particles are particles having a siloxane bond as a main structure and having organic substituents bonded to silicon atoms. Such "particles" includes particles having a high crosslinking degree typified by polymethylsilsesquioxane and particles having a low crosslinking degree typified by methylsilicone rubber particles. In the present invention, it is preferred to use particles having a high crosslinking degree typified by polymethylsilsesquioxane. The organic group substituted on silicone atoms of the above silicone crosslinked particles includes alkane groups such as methyl, ethyl, propyl and butyl, aryl groups such as phenyl, aralkyl groups such as benzyl, and others such as carboxyl, carbonyl, an ester group and an ether group.

Generally, the above silicone crosslinked particles are produced by a method in which tri-functional alkoxysilane, or the like is subjected to hydrolysis and condensation in water to form particles that are three-dimensionally crosslinked each while siloxane bonds are grown. The diameter of such particles can control, for example, on the basis of an alkali amount of a catalyst, a stirring step, or the like.

The polymer fine particles other than the organic crosslinked particles can be produced by any one of a spray drying method, a submerged hardening method (coagulation method), a phase separation method (coacervation method), a solvent evaporation method, a reprecipitation method or a combination of any one of these method with a nozzle vibration method.

The polymer fine particles can be in the form of a single-layered polymer, and can be also in the form of a core-shell polymer or an IPN structure in which two or more components are forming an interpenetration network. Further, the polymer fine particles can be in the form of composite particles each of which is formed of an organic fine particle as a core and an organic crosslinked particle component as a shell or is formed of an organic crosslinked particle as a core and an epoxy resin or a urethane resin as a shell.

The above light-diffusing agent may be surface-treated with various surface-treating agents. Particularly, the inorganic fine particles that are surface-coated with a surface-treating agent are preferred, since the discoloration of a material thereof due to thermal deterioration can be controlled. The surface-treating agent includes organic acid compounds such as fatty acid, resin acid, maleic acid and a sorbic acid, an ester compound from such an organic acid and a monohydric or polyhydric alcohol, a sulfonic-acid-based surfactant, an organic titanate coupling agent, an organic aluminate coupling agent, a phosphate coupling agent, an organosilane coupling agent, a silane compound having Si—H groups and diene polymers such as polybutadiene and polyisoprene.

As a high light-reflecting agent, titanium dioxide particles are preferred. More preferred are titanium dioxide particles that are titanium oxide produced by a chlorine method and have a rutile type crystal structure, although they shall not be limited by any production method, any crystal structure or any particle diameter. Generally, titanium oxide particles for use as a pigment have a diameter of 0.1 to 0.4 μm, and titanium oxide particles having a diameter of less than 0.1 μm can be used without any problem. Generally, these titaniumoxide particles are surface-treated with an inorganic surface-treating agent (alumina and/or silica). These titanium oxide particles are more preferably surface-treated with an organic surface-treating agent. The organic surface-treating agent includes siloxanes such as alkylpolysiloxane, alkylarylpolysiloxane and alkylhydrogenpolysiloxane, and organosilicons such as alkylalkoxysilane and amino-containing silane coupling agent. The surface treatment is preferably carried out with methylhydrogenpolysiloxane, or with methyltrimethoxysilane, trimethylmethoxysilane, N-β (aminoethyl)-γ-aminopropyltrimethoxysilane or N-β (aminoethyl)-γ-aminopropylmethyldimethoxysilane. The surface-treating agent may contain a stabilizer or a dispersing agent in such an amount that the object of the present invention is not impaired. The method for the surface-treatment includes a wet treatment method in which titanium dioxide particles and a surface-treating agent are dispersed in water or an organic solvent, a dry treatment method using a super mixer or a Henschel mixer, and a method in which a surface-treating agent, titanium dioxide particles and a thermoplastic resin are simultaneously mixed with a V-shaped blender, and a method in which these members are charged into an extruder at the same time and extruded, is also effective.

While the laminated structure of the present invention can be molded by various methods, it can be preferably produced by a method of filling a resin in a mold cavity. That is because the degree of form freedom is high so that a higher design can be achieved. The above method is, for example, an injection molding method, and it also includes a rotational molding method, a powder compression molding method and an ultrasonic powder molding method. The injection molding method is more preferred, since such a method enables effective production of the entire laminated structure. The powder molding method is advantageous for producing a large-sized or a low-strain molded article.

In the procedures of producing the laminated structure of the present invention, there is employed a method in which one layer is molded, and then, while the thus-obtained molded article is inserted in a mold in a subsequent step, another layer is molded to laminate these two layers. When molding is carried out in a state where the two layers are inserted in a mold, a laminated structure having a three-layered structure can be obtained.

In the injection molding method, a multiple color molding method of continuously molding a plurality of layers in one molding machine or an insert molding method of molding the layers in independent molding machines, one layer in one molding machine and another layer in another molding machine, is employed as a method of producing the laminated structure of the present invention. In the present invention, a laminated structure having layers all of which are produced by an injection molding method is particularly preferred.

In the above molding method, various molding methods including other factors can be employed. For examples ultra-high speed injection molding, injection compression molding, insulated-mold molding, rapidly heated and cooled-mold molding, in-mold coating molding, sandwich molding and gas-assisted molding can be combined as required. That is, a plurality of these molding methods may be employed.

Of the above molding methods, the ultra-high speed injection molding is particularly suitable when a pattern is formed in an interface of layers of the laminated structure. In such a case, the flow of a resin is liable to come to be complicated, and a resin non-filled portion is liable to finally occur in the pattern depending upon how the resin meanders. In the ultra-high speed injection molding, the melt-viscosity of a resin is decreased, so that the uniform flow of the resin can be accomplished, and that the meandering of the resin can be simplified. In the ultra-high speed injection molding, the injection rate is at least 300 mm/sec, preferably 350 mm/sec.

A combination of the ultra-high speed molding with injection compressing molding is suitable when a precision pattern is formed in the interfacial portion. Further, a molded article having almost no strain or weld can be accomplished. Further, the above combination improves the adhesion of the interface and also serves to improve the laminated structure in strength and lifetime as a product.

In the above injection compression molding, so-called injection press-molding is particularly suitable. The injection press-molding refers to a molding method in which the cavity of a mold at an initial stage is arranged to have a larger volume than a resin to be filled therein, the resin having a smaller volume than the volume of the mold cavity is filled, and the volume of the mold cavity is decreased until the cavity has a predetermined form, to compress the resin inside and fill resin in a resin non-filled portion in the mold cavity, whereby a molded article is obtained.

In the laminated structure of the present invention, particularly, a layer or layers formed after a first layer is/are liable to have a lower resin density on the first resin surface side and in a flow end portion, and on the other hand, the density of a resin is liable to be higher in the vicinity of a gate. As a result, a large-sized laminated structure in particular is liable to suffer distortion.

The above distortion can be decreased to a great extent when the injection press-molding is employed. The reason therefor is as follows. In the injection press-molding, a pressure is exerted in the thickness direction, so that no pressure distribution exists in the in-plane direction of a mold. Further, since the distance in the thickness direction is very small, the loss of the pressure exerted to the resin is small, and the pressure required for proper compression of the resin is uniformly exerted on the resin. Further, even when a resin non-filled portion occurs in a pattern, etc., such a portion can be filled with the resin if the portion is small.

Further, since the injection press-molding enables molding under very low pressure as is generally known, the force level of clamping the mold of an injection molding machine can be greatly lowered. Particularly, in a molded article that has a large size and a large resin-flow length, the above factor works to improve the quality of a product and works to decrease the cost of equipment.

For the same reason, it is preferred to combine the insulated-mold molding and rapidly heated and cooled-mold molding (irradiation with a halogen lamp, heating by electromagnetic induction, high-speed switching between heating media and an ultrasonic wave mold).

That is, in the production of the laminated structure of the present invention, particularly, when a pattern is formed in an interfacial portion, it is preferred to use ultra-high speed injection molding, injection compression molding (including injection press-molding), insulated-mold molding and rapidly heated and cooled-mold molding in combination as required. It is more preferred to use high-speed injection molding in combination with injection compression molding, insulated-mold molding and rapidly heated and cooled-mold molding.

When sandwich molding is used in combination, one layer or the other layer can be formed to have a two-layered structure. When gas-assisted molding is used in combination, one layer, the other layer, or both one layer and the other layer can be formed to have a hollow structure, so that such layer(s) can be decreased in weight and can be imparted with a different design or a different optical function. For example, a compound having photochromic properties is filled in the hollow portion, whereby there can be produced a product having photoreactivity.

When the laminated structure of the present invention is required to have a high surface hardness depending upon an object in use, preferably, the surface thereof is treated to form a hard coating. The hard coating agent can be selected from various hard coating agents, such as a silicone resin hard coating agent and an organic resin hard coating agent. The silicone resin hard coating agent refers to a resin having a siloxane bond, and examples thereof include partial hydrolysis products of trialkoxysilane and tetraalkoxysilane or alkylated products of these, a hydrolysis product of a mixture containing methyltrialkoxysilane and phenyltrialkoxysilane, and a partial hydrolysis condensate of organotrialkoxysilane filled with colloidal silica. While these agents contain alcohol, etc., that are generated during condensation, these agents may be dissolved or dispersed in any organic solvent, water or a mixture of these as required. The organic solvent includes lower fatty acid alcohols, polyhydric alcohols, ethers thereof and esters thereof. For attaining a smooth surface state, the hard coating layer may contain various surfactants such as siloxane and alkyl fluoride surfactants.

Examples of the organic resin hard coating agent include a melamine resin, a urethane resin, an alkyd resin, an acrylic resin and a polyfunctional acrylic resin. The above polyfunctional acrylic resin includes resins such as polyol acrylate, polyester acrylate, urethane acrylate, epoxy acrylate and phosphazene acrylate.

Of the above hard coating agents, a silicone resin hard coating agent is preferred since it has excellent weatherability lasting for a long period of time and relatively high surface hardness. Particularly, it is preferred to form a cured layer prepared by forming a primer layer made of a resin selected from various resins and forming a cured layer made of a silicone resin hard coating resin.

The resin for forming the above primer layer includes urethane resins formed from various block isocyanate components and a polyol component, an acrylic resin, a polyester resin, an epoxy resin, a melamine resin, an amino resin and various polyfunctional acrylic resins such as polyester acrylate, urethane acrylate, epoxy acrylate, phosphazene acrylate, melamine acrylate and amino acrylate. These may be used alone or in combination. Of these, particularly preferred are an acrylic resin and a resin containing at least 50%, preferably at least 60%, by weight of a polyfunctional acrylic resin. A primer layer formed of an acrylic resin is particularly preferred. The primer layer made of an acrylic resin is particularly suitable for a polycarbonate resin.

Further, the resin for forming a primer layer for the silicone resin hard coating agent may contain a light stabilizer or an ultraviolet absorbent that will be discussed later, or may contain various additives or auxiliaries such as a catalyst for the silicone resin hard coating agent, a thermal or photo-polymerization initiator, a polymerization inhibitor, a silicon anti-foamer, a leveling agent, a thickener, a precipitation preventer, a sag preventer, a flame retardant and organic or inorganic pigment or dye.

As an acrylic resin for forming a primer layer for the silicon resin hard coating agent, there can be used any acrylic resin that is (a) an acrylic resin to be used by a method in which a primer composition composed mainly of a monomer component is applied to the surface of a molded article and then the applied composition is cured by heating or irradiation with ultraviolet rays, electron beams or radioactive rays (to be sometimes referred to as "acrylic resin (a)" hereinafter), or (b) an acrylic resin to be used by a method in which a monomer component is polymerized beforehand, a polymer solution or melt is applied as a primer composition and a solvent is evaporated off (to be sometimes referred to as "acrylic resin (b) hereinafter). The latter acrylic resin (b) is particularly preferred, since an unreacted residual monomer that is liable to cause deterioration can be decreased to make its content as small as possible.

In a preferred embodiment of the acrylic resin for use as a primer for the silicone resin hard coating agent, the acrylic resin is a copolymer obtained by copolymerizing an alkyl methacrylate monomer and a (meth) acrylate monomer having an alkoxysilyl group in their molar ratio of 99:1 to 60:40, more preferably 97:3 to 70:30.

Further, in another preferred embodiment of the acrylic resin for use as a primer for the silicone resin hard coating agent, the acrylic resin is in the form of a mixture or a reaction product of 99 to 60% by weight of an acrylic resin containing a hydroxy group and 1 to 40% by weight of a hydrolysis condensate of an alkoxysilane compound (in which the weight is a weight as $R_aR'_b$—$SiO_{4-(a+b)/2}$, and R and R' are monovalent organic groups).

The acrylic resin containing a hydroxy group is preferably a copolymer from an alkyl methacrylate monomer and an alkyl methacrylate monomer containing a hydroxy group, and the monomer is preferably 2-hydroxyethyl methacrylate. The alkoxysilane compound preferably includes alkyltrialkoxysilanes, and particularly preferably includes methyltrimethoxysilane and methyltriethoxysilane. The alkoxysilane compounds can be used alone or in combination. The hydrolysis condensate of an alkoxysilane compound is obtained by hydrolysis condensation under acidic conditions, and the acid is preferably selected from volatile acids such as acetic acid and hydrochloric acid. Further, there may be also used a mixture prepared by further mixing a melamine resin with a mixture or a reaction product of a hydrolysis condensate of an alkoxysilane and an acrylic resin containing a hydroxy group. In the acrylic resin (b), the concentration of a solid content of a resin for forming the primer layer in the primer composition is preferably 1 to 50% by weight, more preferably 3 to 30% by weight.

Further, the above primer composition may contain a light stabilizer and an ultraviolet absorbent for improving the laminated structure in weatherability. The above light stabilizer includes a hindered amine light stabilizer and a nickel complex light stabilizer. These stabilizers may be used alone or in combination. The amount of the light stabilizer per 100 parts by weight of the resin for forming the primer layer is preferably 0.1 to 50 parts by weight, more preferably 0.5 to 10 parts by weight. The above ultraviolet absorbent includes a benzotriazole ultraviolet absorbent, a cyanoacrylate ultraviolet absorbent, a salicylate ultraviolet absorbent and a triazine ultraviolet absorbent. These absorbents may be used alone or in combination. The amount of the ultraviolet absorbent per 100 parts by weight of the resin for forming the primer layer is preferably 0.1 to 100 parts by weight, more preferably 0.5 to 50 parts by weight.

The primer composition may further contain a catalyst for curing the silicone hard coating agent.

The method for applying the above primer composition to the laminated structure surface can be selected from a bar coating method, a doctor blade method, a dip coating method, a flow coating method (shower coater or curtain coater), a spray coating method, a spin coating method or a roller coating method (gravure roll coating method or transfer roll coating method) as required depending upon the form of a substrate. The thickness of the primer layer is preferably 0.1 to 10 μm, more preferably 1 to 5 μm.

The silicone resin hard coating agent more preferably includes organosiloxane resins made of a hydrolysis condensate of a trialkoxysilane compound and a hydrolysis condensate of a tetralkoxysilane compound. The hard coating layer preferably contains colloidally dispersed metal oxide fine particles from the viewpoint of adjustment of a surface hardness, dyeability, refractivity and a coating thickness. Among the above metal oxide fine particles, colloidal silica is a typical example.

The silicone resin hard coating agent more preferably includes an organosiloxane resin formed of a colloidal silica (x component), a hydrolysis condensate of a trialkoxysilane (y component) and a hydrolysis condensate of a tetraalkoxysilane (z component). For obtaining a hard coating composition that forms a hard coating layer excellent in abrasion resistance in particular, preferably, at least 70% by weight of the trialkoxysilane is methyltrialkoxysilane, and more preferably, the total amount thereof is substantially methyltrialkoxysilane. The tetraalkoxysilane preferably includes tetramethoxysilane and tetraethoxysilane. These alkoxysilanes may be used alone or in combination.

Each of the y component and the z component is a mixture of a hydrolysis product of part or the entirety of the alkoxysilane and a condensate, etc., formed by condensation of part or the entirety of the hydroysis product, and these can be obtained by a sol-gel reaction. It is particularly preferred to prepare the hard coating agent by a process comprising the following processes (1) and (2), since no precipitate is formed and since a coating layer more excellent in abrasion resistance can be obtained.

Process (1): Trialkoxysilane in a colloidal silica dispersion is subjected to hydrolysis condensation under acidic conditions.

Process (2): (i) Tetraalkoxysilane is added to a reaction solution obtained by the reaction in Process (1) and subjected to hydrolysis condensation. Alternatively, (ii) the reaction solution obtained by the reaction in Process (1) and a reaction solution prepared by carrying out hydrolysis condensation of tetraalkoxysilane in advance are mixed.

In the mixing ratio of the x component, the y component and the z component that are solid components of the above organosiloxane resin, preferably, the content of the x component is 5 to 45% by weight, the content of y component as $R^8SiO_{3/2}$ is 50 to 80% by weight, and the content of the z component as $SiO_2$ is 2 to 30% by weight. More preferably, the content of the x component is 15 to 35% by weight, the content of y component as $R^8SiO_{3/2}$ is 55 to 75% by weight, and the content of the z component as $SiO_2$ is 3 to 20% by weight. The above $R^8$ stands for a monovalent organic group.

The hard coating composition generally further contains a curing catalyst. The catalyst is preferably selected from sodium acetate, potassium acetate or benzyltrimethylammonium acetate. When basic water-dispersible colloidal silica is used as colloical silica and when an aliphatic carboxylic acid is used as an acid in the hydrolysis of the alkoxysilane, the hard coating composition consequently already contains a curing catalyst.

The method for applying the hard coating composition can be selected from those application methods described above with regard to the primer composition as required. Further, the thickness of the silicone resin hard coating layer is generally 2 to 10 µm, preferably 3 to 8 µm. The hard coating layer can contain the light stabilizer and a ultraviolet absorbent which are already discussed with regard to the primer composition.

The laminated structure of the present invention shows a continuous change in color tone along the sheet surface (gradation color) and is therefore excellent in gracefulness and design.

When the laminated structure is transparent or semi-transparent, it can be used as a decorative organic glass or glass window. When the laminated structure is used as an organic glass or glass window, the organic glass or glass window is excellent in gracefulness as compared with general colorless transparent glass, and when a glass having various colors is used, a product or a window rich in variations can be produced.

Particularly, when the sheet-shaped laminated structure has a three-dimensional pattern of a character (or letter) or a figure in an interfacial portion where two layers are in contact with each other, there can be formed an organic glass having the character (or letter) or figure three-dimensionally emphasized.

In a preferred embodiment of the laminated structure of the present invention, the preferred embodiment is a highly elaborately designed sheet-shaped laminated structure that is composed of the sheet-shaped laminated structure and a light source portion which is positioned in a side end portion of the laminated structure. While the light source portion can be positioned in any side end portion of the laminated structure, the side end portion is preferably a side end portion of a layer containing a colorant and having a monotonous change in thickness from the side surface to the opposite side surface of the laminated structure.

Figure 4:
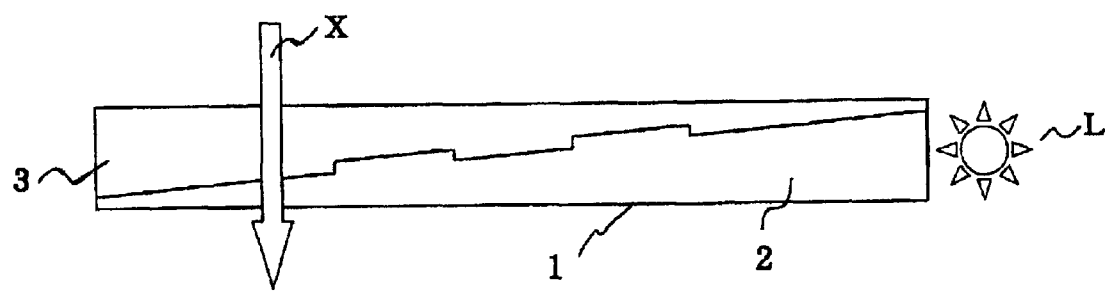
FIG. 4 is a side view of the laminated structure of the present invention, which shows a schematic drawing when a design is observed while a light source (L) is placed toward an end surface of a small-thickness portion of the layer (B) of the laminated structure according to an edge light system.

The above is explained with reference to side views shown in FIGS. 3 and 4. The light source portion is arranged in (a portion toward) a larger-thickness side end portion of a layer 3 of the laminated structure (FIG. 3) or in (a portion toward) a smaller-thickness side end portion of the layer 3 (FIG. 4). The light source portion may be arranged in one side end portion as shown in FIGS. 3 and 4, or such light source portions are arranged in both side end portions, one light source in one side end portion and the other light source in the other edge portion.

Further, when the laminated structure has a light source in a side end portion, preferably, a three dimensional pattern of a character (or letter) or a figure is formed in an interfacial portion where two layers are in contact with each other. That is because an excellent design and gracefulness can be achieved in that, due to the presence of the light source in a side end portion, the pattern is observed like fantasy or three-dimensionally in an interior of the structure whose surface has a continuous change in color tone. The above excellent design is exhibited particularly when one layer contains a fluorescent colorant, a light-diffusing agent or a high light-reflecting agent, and it is preferred to incorporate such additives.

For attaining a design in which a three-dimensional character (or letter) or figure is observed with a light source in a side end portion, the following constitution is preferred. That is, in a preferred constitution, the resin containing a fluorescent colorant or a high light-reflecting agent is used in a layer whose three-dimensional pattern is convex and a light source portion is arranged in a side end portion of a smaller thickness of the layer (that is, on a larger-thickness portion side of a layer that is substantially colorless or colored with other colorant when the structure has a nearly uniform thickness). In the above constitution, a convex portion of the three-dimensional pattern is brighter when a fluorescent colorant is incorporated, and the convex portion has a bright/dark contrast with a portion that is not directly exposed to light when a high light-reflecting agent is incorporated, so that a figure, or the like can be observed three-dimensionally to a greater extent.

Further, the effect of the above excellent design or gracefulness is exhibited when the laminated structure is a transparent or semi-transparent decorative organic glass or window glass.

That is, when the light source portion is arranged in a side end portion of the sheet-shaped laminated structure that is an organic glass, the gradation effect of a color tone is emphasized in exhibition by irradiation with light from the light source portion. Further, the sheet-shaped laminated structure having the above three-dimensional pattern of a character (or letter) or a figure has transparency as whole and can produce an effect that the character (or letter) or figure is emphasized three-dimensionally to a greater extent when irradiated with light from its side edge.

In this case, preferably, the side end portion of the sheet-shaped laminated structure where the light source portion is arrange is an edge portion of a layer containing a dye, a pigment or a light-diffusing agent and having a monotonous change in thickness from the above side end portion to the other side opposite thereto.

Particularly preferred is an embodiment of a decorative organic glass or glass window having one layer which is formed of a transparent resin containing a fluorescent dye and has a monotonous change in thickness at least in one direction of a sheet surface and the other layer which is formed of a substantially colorless transparent resin.

The light source portion is an electric lamp that emits light using, as a power source, a household electric source, an electric source for an automobile, a portable electric source, a battery, or the like. Further, when the laminated structure has a structure in which the side end portion is exposed to light, it is not necessarily required to arrange the light source itself in/toward the side end portion, and light may be introduced to the side end portion through an optical fiber. Further, the electric lamp can be generally any lamp or light selected from known lamps or lights for home use, an automobile, a vehicle, and the like.

The form of the electric lamp is not critical. It can have any form such as the form of a point, a sphere, a tube, a plane, or the like, and any light emission such as point light emission with a point light source, line light emission with a line light source or plane light emission with a plane light source can be employed.

The electric lamp or light can be selected from an incandescent lamp, a tungsten lamp, a halogen tungsten lamp, a halogen lamp, a mercury lamp, a sodium lamp, a xenon lamp, a xenon flash lamp, a metal halide lamp, a fluorescent lamp, LED (light emitting diode), EL (electro luminescence) or a semiconductor laser. It is particularly preferred to use a cold cathode fluorescent lamp for use in the field of information machines, a semi-hot fluorescent lamp, a hot cathode fluorescent lamp, a flat fluorescent lamp, a black light, LED, EL, a semiconductor laser, a short arc metal lamp, a short arc xenon lamp, a halogen lamp, an ultrahigh-pressure mercury lamp, a built-in electrode type rare gas fluorescent lamp, an external electrode type rare gas fluorescent lamp, or the like.

Light from the electric lamp may be directly introduced to a side end portion of the laminated structure, specific wavelength components alone may be introduced through an optical filter or a prism, or the optical axis of light from an electric lamp may be varied through a light-diffusing plate to introduce light. Further, light from an electric lamp may be continuously in a lighting-up state by constant irradiation, or it may be continuously or discontinuously in an on/off state by repeating irradiation and non-irradiation.

The laminated structure of the present invention is formed of a resin and is therefore light in weight, so that it can be used as an automobile window. When used as an automobile window, each layer of the laminated structure is preferably formed of a polycarbonate resin in view of transparency, heat resistance and impact resistance. For use as an automobile window, the laminated structure whose surface hardness is improved by the above surface coating is suitable.

Of various automobile windows, the automobile window of the present invention is preferably used as any one of glass windows other than a windshield or windscreen (front glass). For example, it can be applied to a front door window, a rear door window, a quarter window, a back door window or a sunroof or sunshine roof panel.

Figure 10:
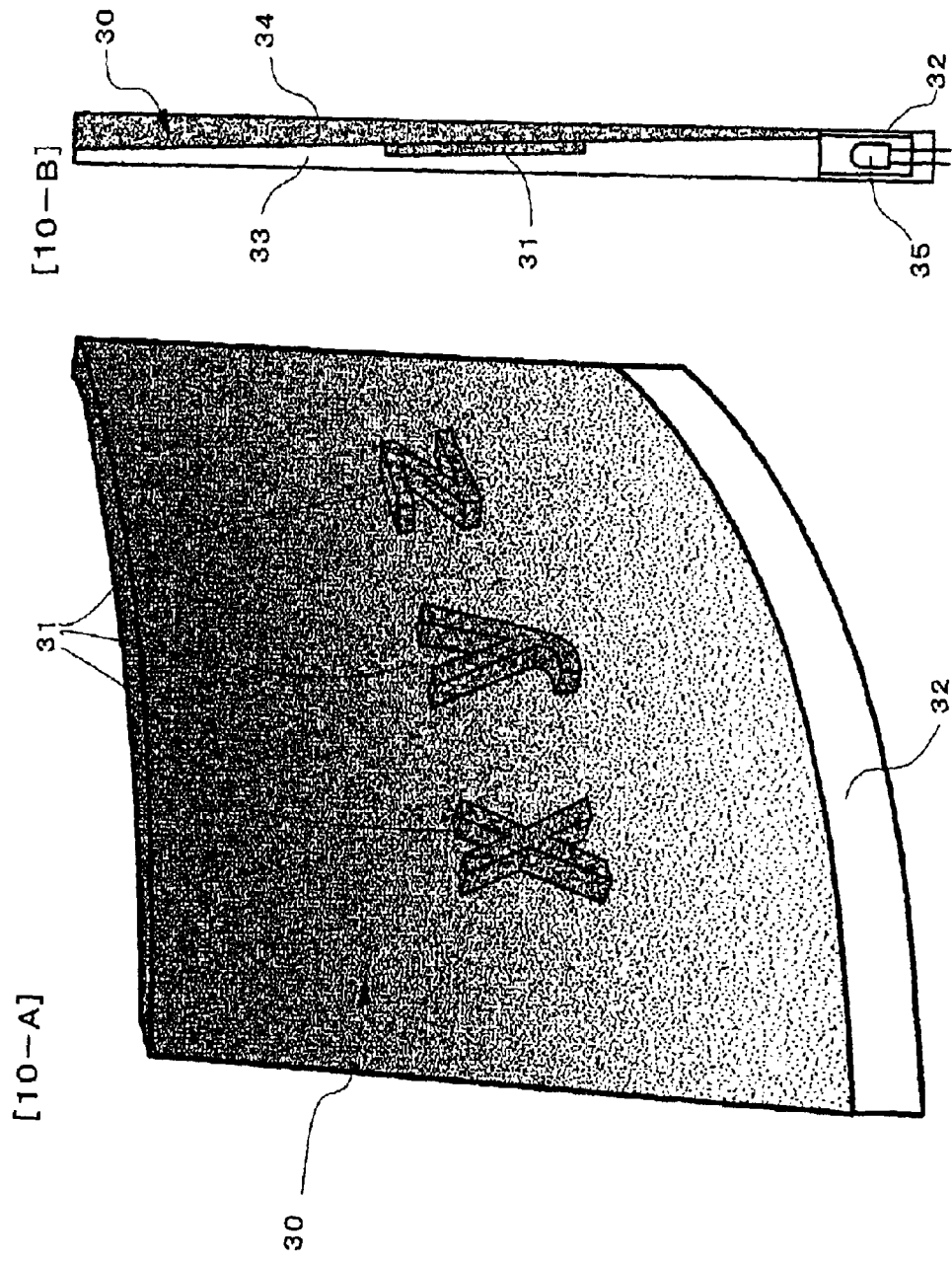
FIG. 10-A is a schematic perspective view of one example of an automobile glass window prepared in Example.
Figure 11:
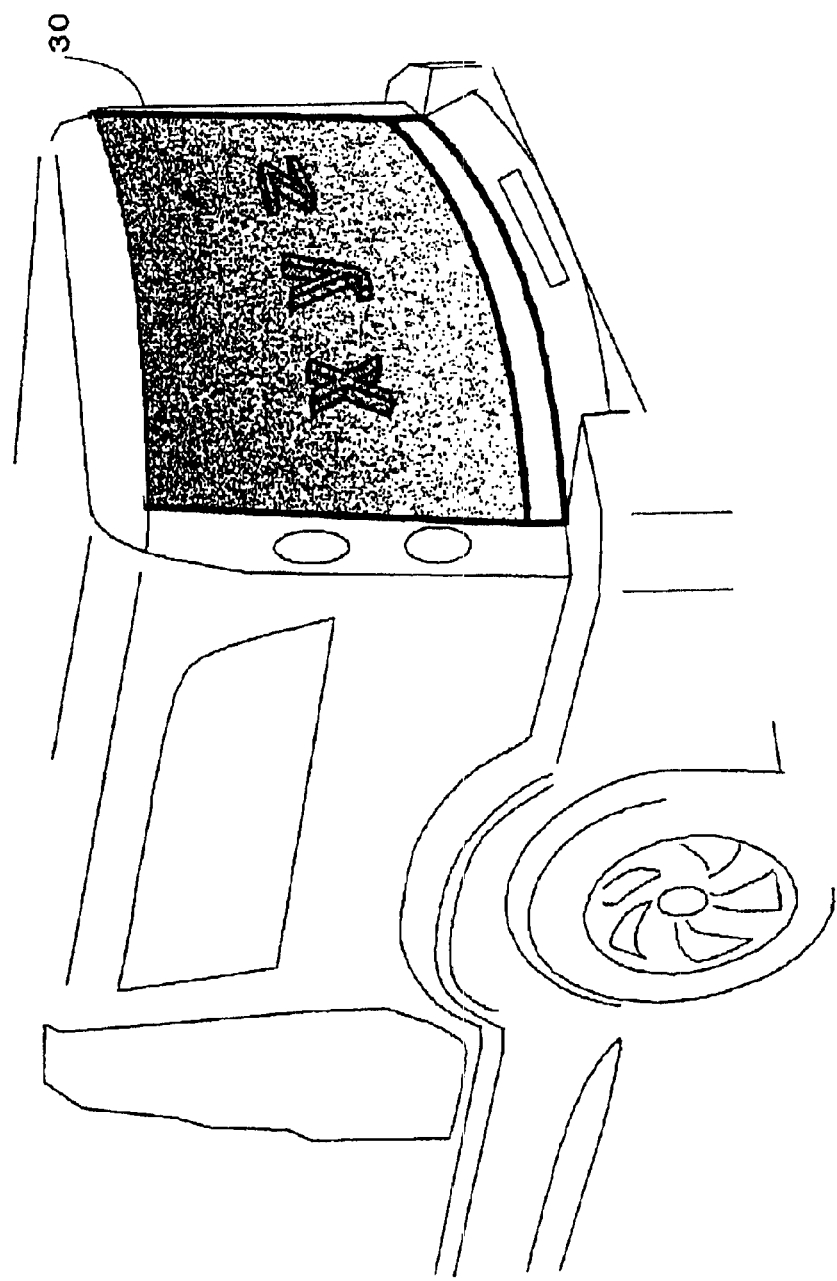
FIG. 11 is a schematic perspective view of an automobile rear window to which an automobile glass window prepared in Example is assumed to applied.

FIG. 10 shows a form of the laminated structure of the present invention when the laminated structure is used as a back window of an automobile. FIG. 11 shows an arrangement of the window in an automobile.

As shown in FIGS. 10 and 11, the color tone may change in density from an upper portion to a lower portion when the laminated structure is applied as an automobile window. The color tone may also change in density from left to right. As shown in FIGS. 10 and 11, a three-dimensional pattern of characters (or letters) or figures is formed in an interfacial portion where two layers of the laminated structure are in contact with each other. In this case, there may be employed a constitution in which the light source portion is arranged in a lower portion of the laminated structure (window) as shown in FIG. 10-B to emit light so that a change in color tone can be emphasized or that the characters (or letters) or figures can be expressed three-dimensionally to a greater extent. Naturally, the light source portion may be positioned not only in a lower portion, but also in any portion such as an upper portion, a left portion or a right portion.

According to the present invention, further, there is provided a box-shaped container that is excellent in gracefulness and design on the basis of the laminated structure.

That is, there is provided a box-shaped container at least one surface of which is composed of the laminated structure. The box-shaped container may be formed of a combination of laminated structures having a different color each. Further, there can be also formed a highly elaborately designed box-shaped container that not only has color(s) but also has a three-dimensional pattern by using laminated structure(s) having a three-dimensional pattern such as a character (or letter) or a figure.

The box-shaped container can be particularly advantageously used as a housing member of various OA machines such as a computer and a portable terminal, a housing member of various electric and electronic machines such as a cellular phone and a portable audio machine, a housing of an optical machine and a housing of a miscellaneous product.

In the box-shaped container, at least one surface thereof is formed of the above sheet-shaped laminated structure. The form of the box-shaped container is not critical, and it can be determined depending upon the form of an article or product to which it is applied. The form may be the form of a box having at least four surfaces and formed of a plate each. In an example of a form having six plates, the form may be the form of a box whose entire surfaces are surrounded by sheet-shaped materials, or may be the form of a box having a hexahedral form but having no plate in two surfaces. The form of a box having no plate in one or two surfaces may be, for example, the form of a box having a hexahedral form having four surrounding surfaces and two upper and lower openings.

The box-shaped container is not necessarily required to have rectangular plates. For example, at least one plate may have a curved form. Further, the box-shaped container may be a box comprising a plate that is curved in the entirety. One example thereof is a tubular box. In the above curved plate or the above tubular box, desirably, the curvature radius (R) is at least L/2, preferably at least 3L, in which L is a length of one side of the surface of a box-shaped structure.

The box-shaped container is required to have a constitution in which at least one surface is formed of the above sheet-shaped laminated structure and is a visible surface for utilizing the advantage of the highly elaborate design of the sheet-shaped laminated structure.

When the box-shaped container is formed, a side surface portion of the sheet-shaped laminated structure can be fused under pressure or bonded with an adhesive. Further, the sheet-shaped laminated structure can be bent in or more places by means of heating, etc., to form a plate having two or more surfaces.

The box-shaped container can be produced by insert molding as will be explained in the following (a) to (c). These methods are given for explanations and may be modified, or other molding method may be employed.

(a) A method in which a sheet-shaped product formed of a layer A having a monotonous change in thickness (the layer A may have a three-dimensional character (or letter) or figure) is prepared in advance by injection molding, or the like, the sheet-shaped product or a plurality of such sheet-shaped products are inserted in a mold, and a resin for a layer B is filled in the mold and stacked on the product by injection molding, to form a box-shaped container.

(b) A method in which a sheet-shaped product formed of a layer A having a monotonous change in thickness (the layer A may have a three-dimensional character (or letter) or figure) is prepared in advance by injection molding, or the like, the obtained sheet-shaped product is bent by means of heating, etc., to form a shaped plate, the shaped plate is inserted in a mold and a resin for a layer B is filled in the mold and stacked on the shaped plate by injection molding, to form a box-shaped container.

(c) A method using two-color molding, in which a sheet-shaped product formed of a layer A having a monotonous change in thickness (the layer A may have a three-dimensional character (or letter) or figure) is prepared in a first mold in advance by injection molding, then, the mold or a molded product is rotated or slid, to obtain a sheet-shaped product, the sheet-shaped product is placed in a second mold, and a resin for a layer B is filled in the second mold and stacked on the product by injection molding, to form a box-shaped container.

In the box-shaped container of the present invention, it is sufficient to use the highly elaborate sheet-shaped laminated structure to constitute at least one surface, and other surface (s) may be formed of other sheet-shaped material, such as a metal plate or a resin plate.

The box-shaped container has a continuous change in color tone which change occurs along the sheet surface, so that the box-shaped container is excellent in design and gracefulness. The box-shaped container can be therefore applied to housings of various machines, equipment, members of machines and equipment and household articles.

The box-shaped container can be applied, for example, to housings of OA machines such as a computer and a peripheral device; housings of communication or electronic and electric machines such as a cellular phone and a portable audio machine; and housings of household articles such as a container for tape or disk cases and a container for various articles.

When the sheet-shaped laminated structure forming a surface is transparent or semi-transparent, a box-shaped container having a light source inside can be formed, and such a box-shaped container can be applied to housings of optical devices such as an illuminating device and a light display.

Figure 15:
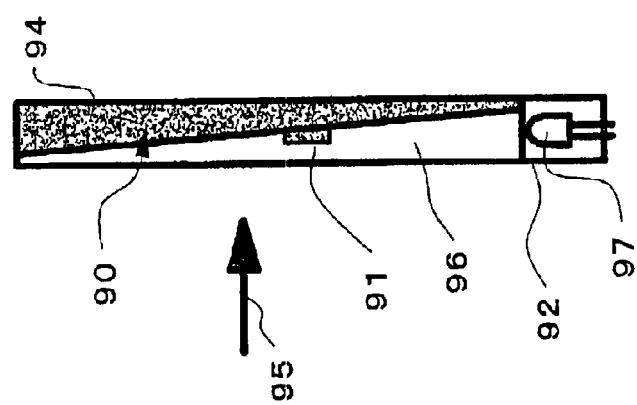
FIG. 15-A is a schematic perspective view of a box-shaped container prepared in Example.
Figure 15:
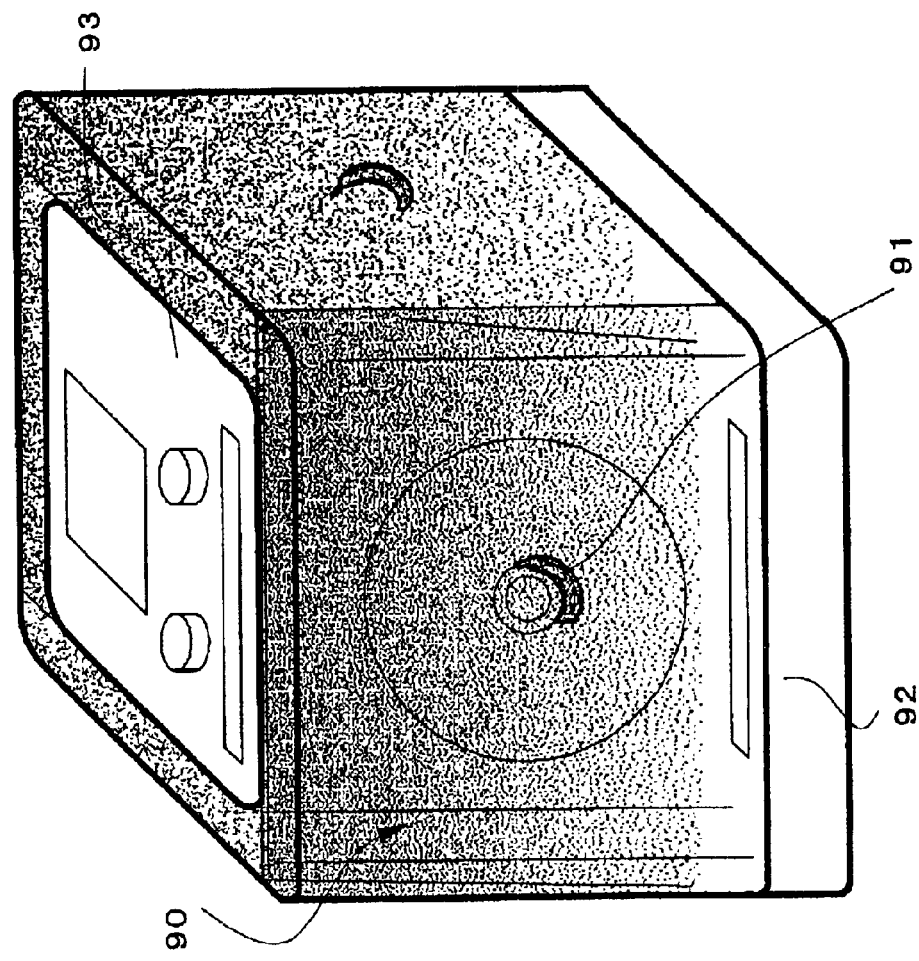

FIG. 15-A is a schematic drawing of a box-shaped container applied to the housing of an OA machine. In the box-shaped container shown in FIG. 15-A, an OA machine (CD player) is housed therein, and four side surfaces are sheet-shaped laminated structures. FIG. 15-B shows a cross section of the sheet-shaped laminated structure forming one side surface.

As shown in FIG. 15-B, the sheet-shaped laminated structure is composed of a layer 94 formed of a resin containing a colorant and a layer 96 containing no colorant, and a pattern 91 is formed in an interfacial surface of the two layers.

Further, a light source portion 92 is arranged in a side end portion of the sheet-shaped laminated structure.

In the OA machine shown in FIG. 15A, each side surface is composed of the above sheet-shaped laminated structure, the laminated structures have patterns, and the OA machine is structured so as to have irradiation with light from a light source portion provided in a lower position. In this manner, there is formed a container having a highly elaborate design based on a change in color (gradation) and also having a pattern that is three-dimensionally displayed. Light from the light source portion may be in a continuous lighting-on state or may be in an on-off state.

As already described, the sheet-shaped laminated structure of the present invention can have any one of a semi-spherical form or a semi-cylindrical form. Further, there may be employed a spherical form produced by combining together semi-spherical structures or a cylindrical form produced by combining together semi-cylindrical structures. In these forms, the change in the thickness of the colored layer can includes various variants, while a change symmetrical to a greater degree is preferred in view of a design. In the semi-spherical form, preferably, the thickness therefore changes symmetrically with regard to a normal line passing through the center of the sphere out of normal lines of a plane constituted of an end portion of a molded article.

The above form is not required to be the form of a complete semi-sphere, or the like, and part thereof may be lacking. For example, the semi-spherical form includes the form of double circles in an image obtained by projection in the direction of the above normal line. In this case, the side end portion of a molded article may be any one of a side portion corresponding to the outer circle or a side portion corresponding to the inner circle.

The above semi-spherical laminated structure is suitable particularly for use in an illuminating globe. As compared with conventional entirely uniform illumination or non-uniform illumination poor in design, the use of the laminated structure of the present invention as an illuminating globe achieves illumination having a radiation intensity distribution excellent in design. Further, where slight light is desired while one is sleeping in bed, excellently, the use of the light source in the side end portion enables production of comfortable light.

That is, according to the present invention, there is provided a decorative illuminating globe comprising a sheet-shaped laminated structure having a semi-spherical form inside which a light source portion can be arranged. There is also provided a decorative illuminating globe comprising two semi-spherical structures that are combined one on the other so as to form a sphere, inside which a light source portion can be arranged. Further, there are provided a decorative illuminating globe having a semi-cylindrical form in place of the above semi-spherical form and a decorative illuminating globe having a cylindrical form in place of the above spherical form.

Further, in these illuminating globes, preferably, a three-dimensional pattern of a character (or letter) or a figure is formed in an interfacial portion of the two layers, and more preferably, a light source is separately provided in a side end portion thereof. The light quantity of the above light source in the side end portion may have any relative intensity to the light quantity of an internal light source. In a preferred embodiment, the light source toward the side end portion has a lower light quantity.

Figure 13:
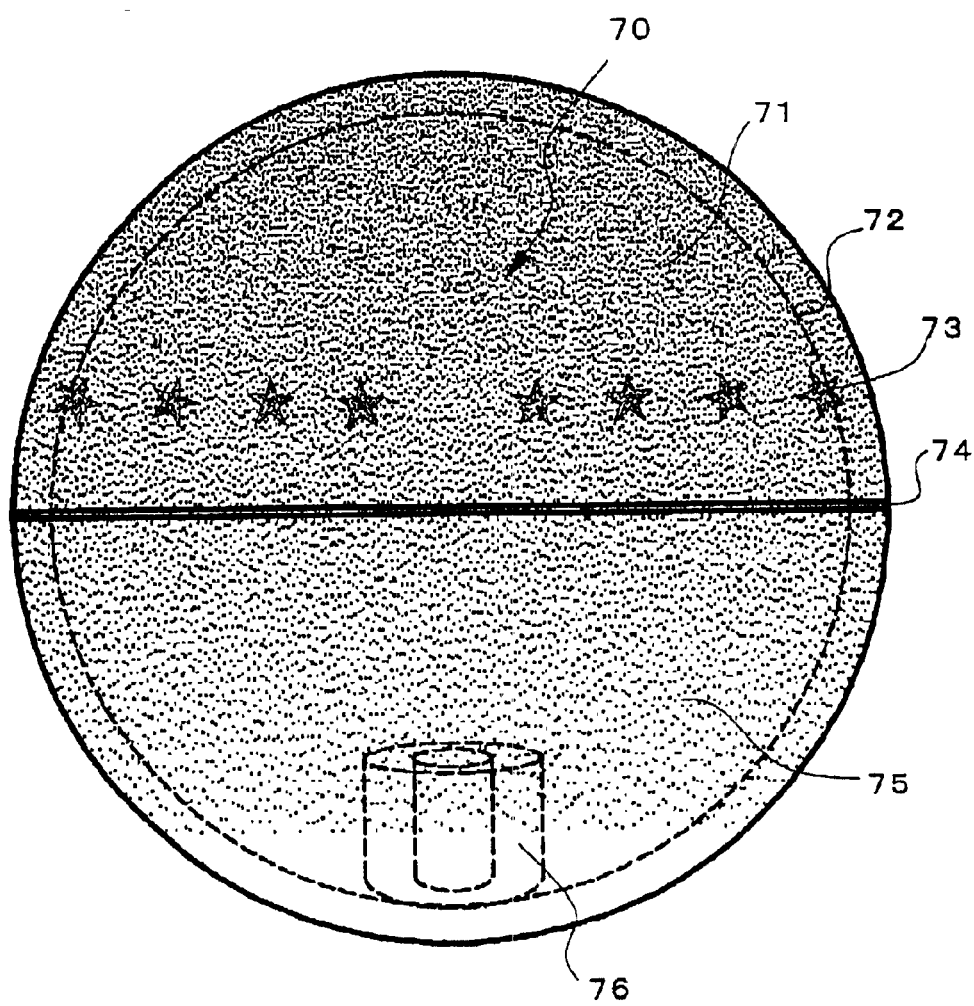
FIG. 13 is a schematic front view of a spherical illuminating globe prepared in Example.
Figure 14:
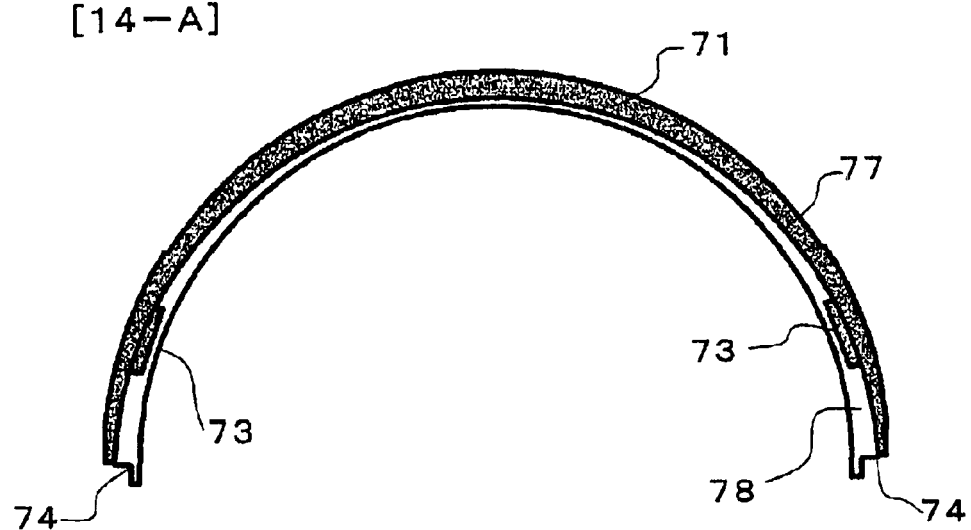
FIG. 14-A is a schematic cross-sectional view of an upper half portion of the illuminating globe in FIG. 13, in which a densely colored portion formed of PC (D) and a white portion is formed of PC (C).
Figure 14:
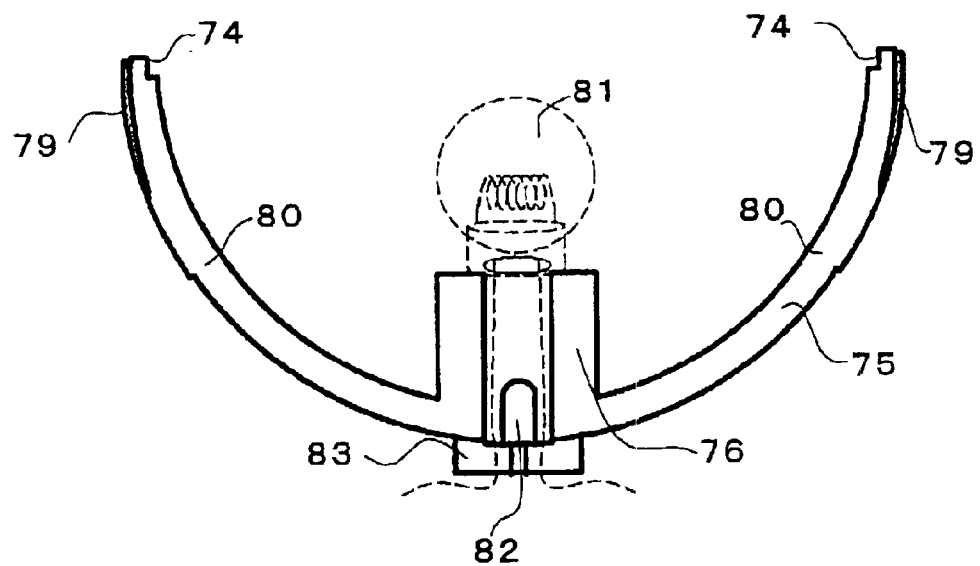

FIGS. 13 and 14 show specific examples of the above embodiment. The illuminating globe has a constitution in which two semi-spheres (71 and 75) are combined to form a globe. For usual illumination, an internal light source (81) is turned on, and where slight lightness is desired, a light source (82) positioned in the side end portion is turned on. A three-dimensional pattern (73) formed in an interfacial portion produces a difference in density of light to achieve an excellent design when the internal light source (81) is on, and it slightly produces an outline to show fantasy-like light when the light source (82) in the side end portion is on.

EXAMPLES

The present invention will be further explained with reference to Examples hereinafter. Molded articles (laminated structures) produced by the following methods were exposed to light from the following light source positioned as below, to evaluate designs of the laminated structures.

(Light Source and Position)

(i) Backlight method: As shown in FIG. 2, the following light source was arranged behind a laminated structure and the laminated structure was evaluated for a design from a front surface side.

(Light source a): A 40 W white light fluorescent lamp (rated voltage 100 V) that was placed behind a laminated structure (there was employed a structure like a light box for photography, in which a light-diffusing plate having a thickness of 2 mm was placed on the fluorescent lamp, and a laminated structure was placed on the light-diffusing plate that was uniformly bright).

(Light source b): A 100 W halogen lamp (rated voltage 12 V, total luminous flux 3,000 lm) that was placed behind a laminated structure (the laminated structure was placed 5 cm apart from the halogen lamp).

(ii) Edge light method: As shown in FIGS. 3 and 4, the following lamp was placed toward a side end portion of a laminated structure (larger-thickness side end portion or a smaller-thickness side end portion), and the laminated structure was evaluated for a design from the front surface side.

(Light source c): A straight-pipe type cold cathode fluorescent lamp having a diameter of 2.5 mm and a length of 220 mm (long lifetime type, central brightness 35,000 cd/m$^2$, lamp electric current 6 mA, supplied by NEC) that was placed nearly in contact with the side end portion of larger-thickness side of layer B of a laminated structure.

(Light source d): High-brightness type white light LEDs that were linearly arranged at constant intervals so to be nearly in contact with the side end portion of smaller-thickness side of layer B of a laminated structure (ii)-1. Side end portion of larger-thickness portion: A lamp was placed in a side end portion of larger-thickness portion of layer B of a laminated structure.

(ii)-2. Side End Portion of Smaller-Thickness Portion: A lamp was placed in a side end portion of smaller-thickness portion of layer B of a laminated structure.

(1) Design ①

A laminated structure as a whole was visually evaluated for a design from the front surface side of the laminated structure. The evaluation was conducted with regard to a color tone and a density (gradation) thereof from the larger-thickness portion to the smaller thickness portion of the laminated structure.

(2) Design ②

A character (or letter) expressed inside a laminated structure was visually evaluated for a design from the front surface side of the laminated structure. The evaluation was made on the basis of the following ratings.

(2)-1. Form:
(i) Flat . . . A character (or letter) expressed inside a laminated structure looks flat.
(ii) Three-dimensional . . . A character (or letter) expressed inside a laminated structure looks three-dimensionally (That is, a depth is observed in a character (or letter) and the character (or letter) looks like a character (or letter) floating inside the laminated structure).

(2)-2: Decorativeness:
(i) Emphatic . . . A character (or letter) expressed inside a laminated structure looks emphatic.
(ii) Decolorized . . . A character (or letter) expressed inside a laminated structure looks decolorized.
(iii) Fantasy-like . . . A character (or letter) expressed inside a laminated structure shows its outline in a dim state in diffused light and looks fantasy-like.

Thermoplastic resins for use in Examples were prepared as follows.

(I) <Case Where Part of Layer is Composed of Material Containing Dye>

Referential Examples 1–6

Component(s) shown in Table 2 were dry-blended in an amount ratio (unit:part by weight) shown in Table 2, and then a blend was extruded with a vented single-screw extruder (VSK-30 supplied by Nakatani KiKai K.K.) equipped with a 30 mmφ-diameter screw having two Dulmage mixing sections at a cylinder temperature of 290° C. and a die temperature of 290° C. at a vent suction degree of 3,000 Pa, to prepare strands. The strands were cooled in a water bath and cut with a pelletizer to form pellets. The pellets were dried with a hot air dryer, and molded as shown in Examples to be described later. A raw material shown by a sample symbol "PMMA" was directly dried and used for molding as it was without carrying out the above melt-kneading.

TABLE 2

| Raw Material | | Referential Example | | | | | |
|---|---|---|---|---|---|---|---|
| | | 1 | 2 | 3 | 4 | 5 | 6 |
| Thermoplastic resin | PC | 100 | | 99.98 | | | |
| | PMMA | | 100 | | 99.98 | | |
| | PO | | | | | 99.97 | 99.98 |
| Colorant | R | | | 0.02 | | | |
| | Y | | | | 0.02 | 0.024 | |
| | G | | | | | 0.006 | |
| | B | | | | | | 0.02 |
| Sample symbol | | PC | PMMA | PC (R) | PMMA (Y) | PO (GY) | PO (B) |

Symbols for components shown in the column of the raw material in Table 2 stand for the following.

(Thermoplastic Resin)

PC: A mixture containing 99.77 parts by weight of a polycarbonate resin powder formed from bisphenol A and phosgene by a conventional method and having a viscosity average molecular weight of 18,500, 0.03 part by weight of Sandstab P-EPQ (supplied by Sandoz Ltd.) and 0.2 part by weight of pentaerythritol tetrastearate (the stabilizer, the mold release agent and optionally, a colorant were preliminarily uniformly mixed, followed by melt-extrusion to obtain pellets). For PC and a resin composition containing PC, the condition of drying in molding was set at 120° C. for 5 hours, the cylinder temperature was set at 300° C., and the mold temperature was set at 100° C.

PMMA: Polymethyl methacrylate resin (DELPET80N, supplied by Asahi Chemical Industry Co., Ltd.). For PMMA and a resin composition containing PMMA, the condition of drying in molding was set at 100° C. for 5 hours, the cylinder temperature was set at 280° C., and the mold temperature was set at 80° C.

PO: Cyclopolyolefin resin (Zeonex E48R, supplied by ZEON CORPORATION). For PO and a resin composition containing PO, the condition of drying in molding was set at 120° C. for 5 hours, the cylinder temperature was set at 300° C., and the mold temperature was set at 100° C.

(Colorant)
R: Perinone red dye (Plast Red 8315, supplied by Arimoto Chemical Co., Ltd.)
Y: Quinoline yellow dye (Plast Yellow 8050, supplied by Arimoto Chemical Co., Ltd.)
G: Anthraquinone green dye (Oil Green 5602, supplied by Arimoto Chemical Co., Ltd.)
B: Anthraquinone blue dye (MACROLEX Blue RR, supplied by Bayer AG.)

Molded articles were produced by the following methods.

Example 1

The above polycarbonate resin (PC(R)) and the above polycarbonate resin (PC) were respectively dried with a hot air dryer at 120° C. for 5 hours and then molded with a multiple-color-molding injection molding machine (FN-8000-36ATN, supplied by Nissei Plastic Industrial Co., Ltd.) having two injection devices having a cylinder internal diameter of 50 mm each. With one of the two cylinders, a molded article for forming a layer (A) shown in FIG. 5 was formed at a cylinder temperature of 300° C. at a mold temperature of 100° C. and at an injection rate of 150 mm/second. The above molded article for forming the layer (A) was 4.2 mm thick on the gate side and 0.8 mm thick on the flowing end side, and it was formed to have an upward convex on a surface (layer (A) surface) formed of lines connecting the above two sides. In the central portion thereof, a three-dimensional pattern of letters (TCL) was formed, and the portion of the letters had an upward convex thickness of +1 mm from the above layer (A) surface.

Figure 6:
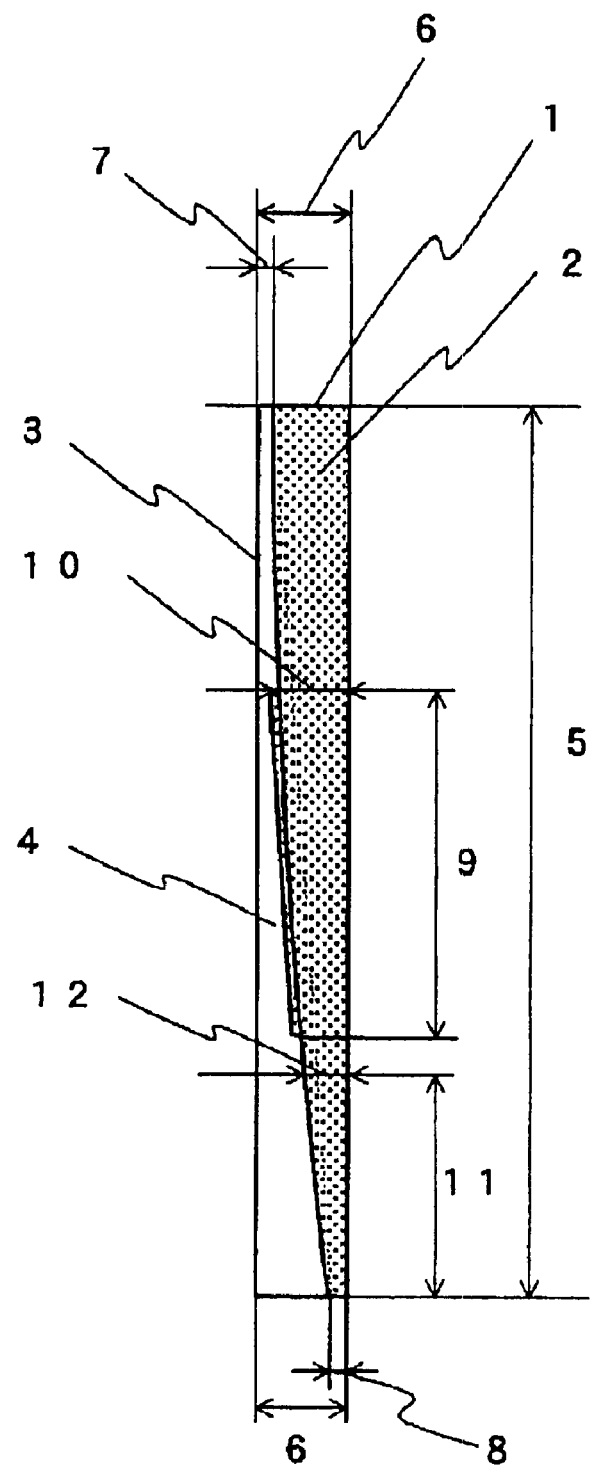
FIG. 6 is a schematic side view of outline of the laminated structure used in Example.
Figure 9:
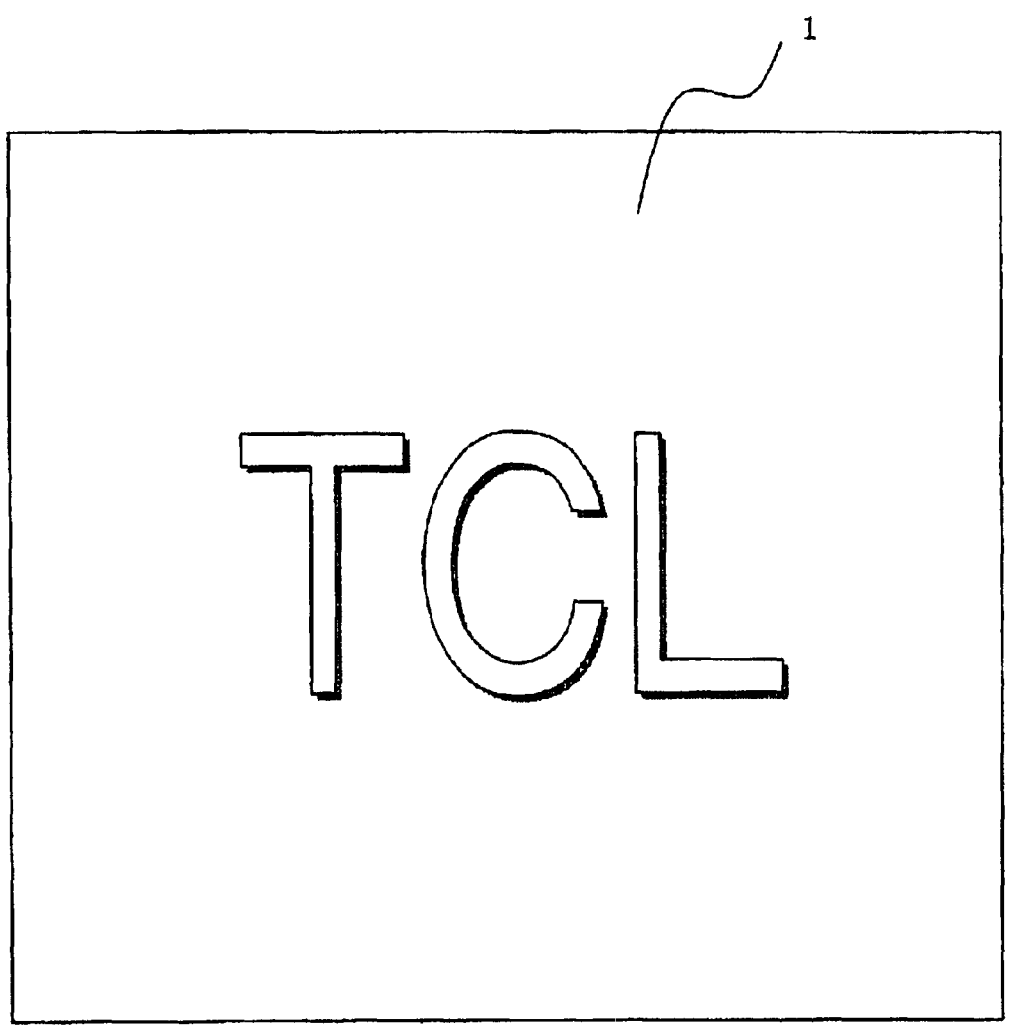
FIG. 9 is a schematic front view of outline of a laminated structure used in Example and shows an embodiment in which a color tone changes from a dense color in a lower portion of the drawing to a light color in an upper portion but showing of such a change in the drawing is omitted.

After the above molding, a mold plate on the core side in the above molding machine was replaced, and a layer (B) was formed. The formation of the layer (B) was carried out after the molded article forming the above layer (A) was inserted in a mold (fixed mold member side). For forming the layer (B), the remaining cylinder of the two cylinders was used, and a resin for forming the layer(B)was injection-molded at a cylinder temperature of 300° C. at a mold temperature of 100° C. at an injection rate of 300 mm/sec, to obtain an integrated molded article (laminated structure) shown in FIGS. 6 and 9.

In the formation of the layer (B), the mold was closed, and then, a vacuum pump (a combination of a ULVAC PMB006CM mechanical booster and an EC803 rotary pump, supplied by ULVAC JAPAN Ltd.) was used to discharge gas for 10 seconds, followed by the molding). The gas was discharged through a discharging clearance provided in the circumference of the cavity of the mold.

Figure 7:
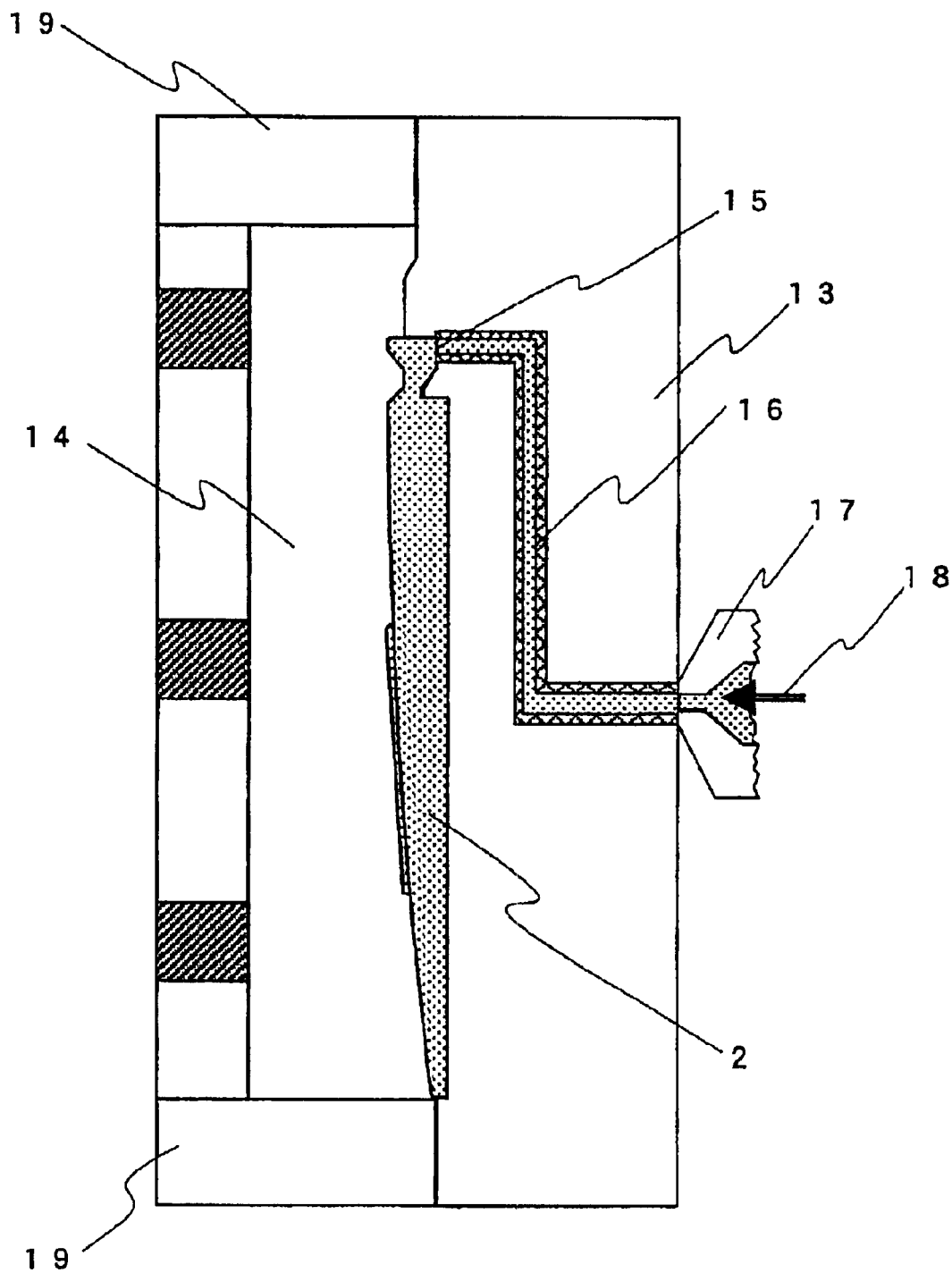
FIG. 7 is a schematic side view of a mold used for forming the layer (A), in which showing of a hot runner for the layer (B) on a fixed mold member side is omitted.
Figure 8:
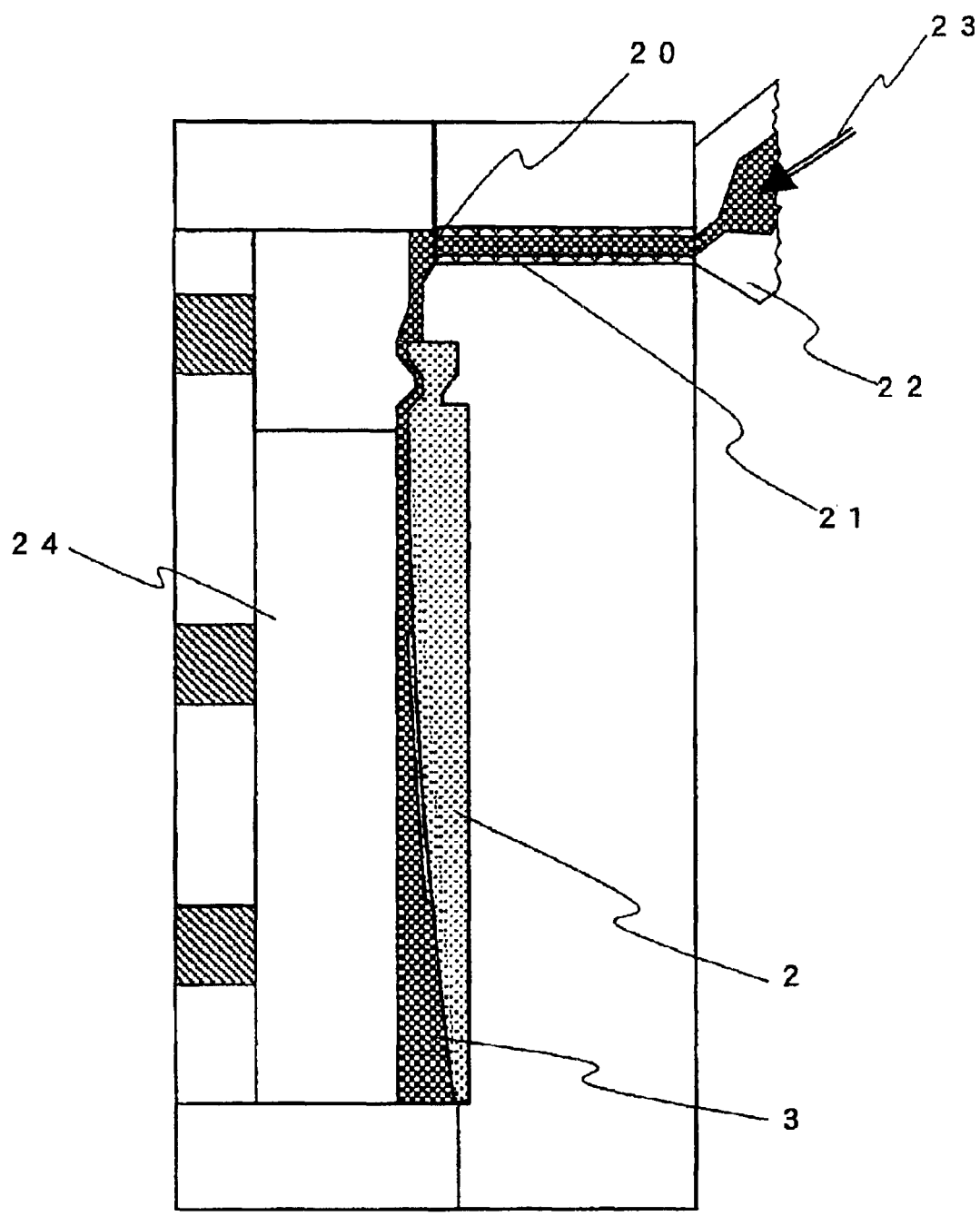
FIG. 8 is a schematic side view of a mold used for forming the layer B) while a molded article for the layer (A) is inserted, in which showing of a hot runner for the layer (A) on a fixed mold member side is omitted.

Further, with regard to the mold, one mold was used, and plates were changed (in FIGS. 7 and 8, showing of one of two flow paths is omitted). The formation of each of the layer (A) and the layer (B) was carried out by a hot runner method (external heating method, supplied by Mold-Masters Limited) at a temperature of 310° C. The hot runner has a gate diameter of 3.5 mmφ.

Example 2–4

Integrated molded articles were (laminated structures) were obtained in the same manner as in Example 1 except that the drying condition, the cylinder temperature and the mold temperature were modified according to materials to be molded.

As is clear from Table 3, in Example 1 for example, the color has a gradation from a reddish color in the larger-thickness portion of the molded article layer (B) to dense red in the smaller-thickness portion of the layer (B), and there is obtained an excellent design in which the letters expressed in the molded article look emphatic in the entire molded article.

(II) <Case Where Part of Layer is Composed of Material Containing Fluorescent Dye>

Referential Examples 1, 2 and 7 to 10

Component(s) shown in Table 4 were dry-blended in an amount ratio shown in Table 4, and then a blend was extruded with a vented single-screw extruder (VSK-30 supplied by Nakatani KiKai K.K.) equipped with a 30 mmφ-diameter screw having two Dulmage mixing sections at a cylinder temperature of 290° C. and a die temperature of 290° C. at a vent suction degree of 3,000 Pa, to prepare strands. The strands were cooled in a water bath and cut with a pelletizer to form pellets. The pellets were dried with a hot air dryer, and molded as shown in Examples to be described later. Raw materials shown by sample symbols "PMMA" and "PO" were directly dried and used for molding as they were without carrying out the above melt-kneading.

TABLE 4

| Raw material | | (Unit: Part by weight) | | | | | |
|---|---|---|---|---|---|---|---|
| | | Referential Example | | | | | |
| | | 1 | 2 | 7 | 8 | 9 | 10 |
| Thermo- | PC | 100 | | | 99.98 | 99.98 | |
| plastic | PMMA | | 100 | | | | 99.98 |
| resin | PO | | | 100 | | | |
| Colorant | FR | | | | 0.02 | | |
| (fluoresc- | FY | | | | | 0.02 | |
| ent dye) | FO | | | | | | 0.02 |
| Sample symbol | | PC | PMMA | PO | PC(FR) | PC(FY) | PMMA (FO) |

Symbols for components shown in the column of the raw material in Table 4 stand for the following.
(Colorant (Fluorescent Dye))
FR: Perylene fluorescent red dye (LUMOGEN F Red 300, supplied by BASF)

TABLE 3

| | | | Example | | | |
|---|---|---|---|---|---|---|
| | | | 1 | 2 | 3 | 4 |
| Layer constitution (Light source a) Backlight method | | Layer (B) | PC | PMMA(Y) | PO(GY) | PO(B) |
| | | Layer (A) | PC(R) | PC(R) | PC | PMMA |
| | Design ① | Color tone | Red | Red · Orange · Yellow | Green | Blue |
| | Density | Layer B, larger-thickness portion | Reddish | Red | Dense green | Dense blue |
| | | Layer B, Central portion | Red | Orange | Green | Blue |
| | | Layer B, smaller-thickness portion | Dense red | Yellow | Greenish | Bluish |
| | Design ② | Form | Flat | Flat | Flat | Flat |
| | | Decorativeness | Emphatic | Emphatic | Decolorized | Decolorized |

FY: Perylene fluorescent yellow dye (LUMOGEN F Yellow 083, supplied by BASF)
FO: Perylene fluorescent orange dye (LUMOGEN F Orange 240, supplied by BASF)

Molded articles were prepared by the following methods.

Examples 5–7

Integrated molded articles (laminated structures) were obtained in the same manner as in Example 1 except that materials shown in Table 5 were used and that the drying condition, the cylinder temperature and the mold temperature were modified according to the materials to be molded.

TABLE 5

| Layer constitution | | | | Example | | |
|---|---|---|---|---|---|---|
| | | | | 5 | 6 | 7 |
| | | Layer B | | PC | PMMA | PO |
| | | Layer A | | PC(FR) | PC(FY) | PMMA(FO) |
| (Light source a) Backlight method | Design ① | Color tone | | Fluorescent red | Fluorescent yellow | Fluorescent orange |
| | | Density | Layer B, larger-thickness portion | Fluorescent reddish | Fluorescent yellowish | Fluorescent light orange |
| | | | Layer B, central portion | Fluorescent red | Fluorescent yellow | Fluorescent orange |
| | | | Layer B, smaller-thickness portion | Fluorescent dense red | Fluorescent dense yellow | Fluorescent dense orange |
| | Design ② | Form | | Flat | Flat | Flat |
| | | Decorativeness | | Emphatic | Emphatic | Emphatic |
| (Light source c) Edge light method | | Position of light source | | End surface of larger-thickness portion | End surface of larger-thickness portion | End surface of larger-thickness portion |
| | Design ① | Color tone | | Fluorescent red | Fluorescent yellow | Fluorescent orange |
| | | Density | Layer B, larger-thickness portion | Fluorescent reddish | Fluorescent yellowish | Fluorescent light orange |
| | | | Layer B, central portion | Fluorescent red | Fluorescent yellow | Fluorescent orange |
| | | | Layer B, smaller-thickness portion | Fluorescent dense red | Fluorescent dense yellow | Fluorescent dense orange |
| | Design ② | Form | | three-dimensional | three-dimensional | three-dimensional |
| | | Decorativeness | | Emphatic | Emphatic | Emphatic |

As is clear from Table 5, in Example 7 for example, the color has a gradation from a fluorescent reddish color in the larger-thickness portion of the molded article layer (B) to fluorescent dense red in the smaller-thickness portion of the layer (B). Further, when a white light fluorescent lamp (light source a) is lighted from behind the molded article, there is obtained an excellent design in which the letters expressed in the molded article look emphatic in a flat form in the entire molded article.

Further, when a cold cathode fluorescent lamp (light source c) is lighted toward a side surface of the larger-thickness portion of the layer (B) of the molded article, the letters expressed inside the molded article emit light to give a density difference, whereby there is obtained an excellent design in which the letters are emphasized three-dimensionally in the entire molded article.

(III) <Case Where Part of Layer is Composed of Material Having High Reflectivity>

Referential Examples 3, 4, 11 and 12

Components shown in Table 6 were dry-blended in an amount ratio shown in Table 6, and then a blend was extruded with a vented single-screw extruder (VSK-30 supplied by Nakatani KiKai K.K.) equipped with a 30 mmφ-diameter screw having two Dulmage mixing sections at a cylinder temperature of 290° C. and a die temperature of 290° C. at a vent suction degree of 3,000 Pa, to prepare strands. The strands were cooled in a water bath and cut with a pelletizer to form pellets. The pellets were dried with a hot air dryer, and molded as shown in Examples to be described later.

TABLE 6

(Unit: part by weight)

| | | Referential Example | | | |
|---|---|---|---|---|---|
| Raw material | | 3 | 4 | 11 | 12 |
| Thermoplastic resin | PC | 99.98 | | | 90 |
| | PMMA | | 99.98 | | |
| | PO | | | 99.98 | |
| General dye | R | 0.02 | | | |
| | Y | | 0.02 | | |
| Fluorescent dye | FR | | | 0.02 | |
| High light-reflecting agent | Ti | | | | 10 |
| Sample symbol | | PC(R) | PMMA(Y) | PO(FR) | PC(Ti) |

Symbols for components shown in the column of the raw material in Table 6 stand for the following.
(High Light-reflecting Agent)
Ti: Titanium oxide (PC-3, supplied by Ishihara Sangyo Kaisha, Ltd.)

Molded articles were prepared by the following method.

Examples 8–10

Integrated molded articles (laminated structures) were obtained in the same manner as in Example 1 except that materials shown in Table 7 were used and that the drying condition, the cylinder temperature and the mold temperature were modified according to the materials to be molded.

TABLE 7

| | | | Example | | |
|---|---|---|---|---|---|
| | | | 8 | 9 | 10 |
| Layer constitution (Light source c) Edge light method | Layer B Layer A Position of light source | | PO(FR) PC(Ti) End surface of larger-thickness portion | PMMA(Y) PC(Ti) End surface of larger-thickness portion | PC(R) PC(Ti) End surface of larger-thickness portion |
| | Design① | Color tone | Fluorescent red | Yellow | Red |
| | | Density Layer B, larger-thickness portion | Fluorescent dense red | Dense yellow | Dense red |
| | | Layer B, central portion | Fluorescent red | Yellow | Red |
| | | Layer B, smaller-thickness portion | Fluorescent reddish | Yellowish | Reddish |
| | Design② | Form | threedimensional | threedimensional | threedimensional |
| | | Decorativeness | Decolorized | Decolorized | Decolorized |

As is clear from Table 7, in Example 8 for example, the portion of letters expressed inside the molded article causes light reflection different from that in any other portion when a cold cathode fluorescent lamp (light source c) is lighted toward a side surface of the larger-thickness portion of the layer (B) of the molded article, whereby there is obtained an excellent design in which the letters look emphatic three-dimensionally in the entire molded article.

(IV) <Case Where Part of Layer is Composed of Material Having Light-diffusing Properties>

Referential Examples 3, 10 and 13 to 15

Components shown in Table 8 were dry-blended in an amount ratio shown in Table 8, and then a blend was extruded with a vented single-screw extruder (VSK-30 supplied by Nakatani KiKai K.K.) equipped with a 30 mmφ-diameter screw having two Dulmage mixing sections at a cylinder temperature of 290° C. and a die temperature of 290° C. at a vent suction degree of 3,000 Pa, to prepare strands. The strands were cooled in a water bath and cut with a pelletizer to form pellets. The pellets were dried with a hot air dryer, and molded as shown in Examples to be described later.

TABLE 8

(Unit: part by weight)

| | | Referential Example | | | | |
|---|---|---|---|---|---|---|
| Raw material | | 3 | 10 | 13 | 14 | 15 |
| Thermoplastic resin | PC | 99.98 | | 99.9 | 99.68 | |
| | PMMA | | 99.98 | | | 97 |
| General dye | R | 0.02 | | | | |
| | Y | | | | 0.02 | |
| Fluorescent dye | FO | | 0.02 | | | |
| Light-diffusing agent | S | | | 0.1 | | |
| | A | | | | 0.3 | |
| | M | | | | | 3 |

TABLE 8-continued (Unit: part by weight)

| | Referential Example | | | | |
|---|---|---|---|---|---|
| Raw material | 3 | 10 | 13 | 14 | 15 |
| Sample symbol | PC(R) | PMMA (FO) | PC(S) | PC(AY) | PMMA (G) |

Symbols for components shown in the column of the raw material in Table 8 stand for the following.

(Light-diffusing Agent)

S: Silicone crosslinked particles (Tospearl 120, supplied by GE Toshiba Silicones Co., Ltd.)
A: Acrylic crosslinked particles (Techpolymer MBX-5, supplied by Sekisui Plastic Co., Ltd.)
M: Inorganic fine particles (Glass fiber PFE-301S, supplied by Nitto Boseki Co., Ltd.)

Molded articles were prepared by the following method.

Examples 11–14

Integrated molded articles (laminated structures) were obtained in the same manner as in Example 1 except that materials shown in Table 9 were used and that the drying condition, the cylinder temperature and the mold temperature were modified according to the materials to be molded.

TABLE 9

|  |  |  | Example | | | |
|---|---|---|---|---|---|---|
|  |  |  | 11 | 12 | 13 | 14 |
| Layer constitution (Light source b) Backlight method | Design① | Layer B | PC(R) | PMMA(FO) | PC(R) | PC(R) |
|  |  | Layer A | PC(AY) | PC(S) | PMMA(G) | PMMA(G) |
|  |  | Color tone | Red · orange · yellow | Fluorescent orange | Red | Red |
|  |  | Density — Layer B, larger-thickness portion | Red | Fluorescent dense orange | Dense red | Dense red |
|  |  | Layer B, central portion | Orange | Fluorescent orange | Red | Red |
|  |  | Layer B, smaller-thickness portion | Yellow | Fluorescent light orange | Reddish | Reddish |
|  | Design② | Form | Flat | Flat | Flat | Flat |
|  |  | Decorativeness | decolorized | decolorized | decolorized | decolorized |
| (Light source d) Edge light method | | Position of light source | End surface of larger-thickness portion | End surface of larger-thickness portion | End surface of larger-thickness portion | End surface of smaller-thickness portion |
|  | Design ① | Color tone | Yellow · Orange · Red | Fluorescent orange | Red | Red |
|  |  | Density — Layer B, larger-thickness portion | Red | Fluorescent dense orange | Dense red | Red |
|  |  | Layer B, central portion | Orange | Fluorescent orange | Red | Red |
|  |  | Layer B, smaller-thickness portion | Yellow | Fluorescent light orange | Reddish | Red |
|  | Design ② | Form | Flat | Flat | Flat | Flat |
|  |  | Decorativeness | Fantasy-like | Fantasy-like | Fantasy-like | Fantasy-like |

As is clear from Table 9, in Example 11 for example, the color has a gradation from red in the larger-thickness portion of the molded article layer (B) to yellow in the smaller-thickness portion of the layer (B) through orange when a halogen lamp (light source b) is lighted. Further, there is obtained an excellent design in which the letters expressed in the molded article look decolorized in a flat form in the entire molded article.

Further, when high-brightness type white light LEDs (light source d) are lighted toward a side surface of larger-thickness portion of the layer (B) of the molded article, the letters expressed in the molded article show outlines in a slightly dim state in diffused light. Further, since the letters are in a decolorized state, there is obtained an excellent design that causes a fantasy-like sense.

Further, as seen in Example 14, when high-brightness type white light LEDs (light source d) are lighted toward a side surface of smaller-thickness portion of the layer (B) of the molded article, the surface is bright in a uniform color having a difference in density. That is, when part of the layer is composed of a light-diffusing material, there can be obtained a design that differs depending upon directions in which light is introduced.

Referential Examples 16–22

Components shown in Table 10 were dry-blended with a tumbler in an amount ratio (unit; part by weight) shown Table 10, and then a blend was extruded with a vented twin screw extruder (KTX-30, supplied by Kobe Steel, Ltd.) equipped with a screw having a diameter of 30 mmϕ and an L/D of 33.2 and having two kneading zones at a cylinder temperature of 290° C. and a die temperature of 290° C. at a vent suction degree of 3,000 Pa, to prepare strands. The strands were cooled in a water bath and cut with a pelletizer to form pellets. The pellets were dried with a hot air dryer, and molded as shown in Examples to be described later. In the dry-blending, as additivies in an amount of less than 1 part by weight per 100 parts by weight of PC (polycarbonate resin), a master of PC was used, which master had been prepared by uniformly mixing PC with 10% by weight of a mold release agent and 1% by weight of each of a fluorescent dye, a general dye, a light-diffusing agent and an ultraviolet absorbent with a super mixer. Further, as additives in an amount of less than 0.01 part by weight per 100 parts by weight of PC, a master agent 1% by weight of the master agent of 1% by weight of the additive was used.

TABLE 10

| Additives | Raw material | Referential Example | | | | | | |
|---|---|---|---|---|---|---|---|---|
|  |  | 16 | 17 | 18 | 19 | 20 | 21 | 22 |
| PC | PC | 100 | 100 | 100 | 100 | 100 | 100 | 100 |
| Phosphorus stabilizer | PQ | 0.05 | 0.05 | 0.05 | 0.05 | 0.05 |  | 0.05 |
|  | M |  |  |  | 0.05 |  | 0.05 |  |
|  | IR |  |  |  |  |  |  | 0.05 |

TABLE 10-continued

| Additives | Raw material | Referential Example | | | | | | |
|---|---|---|---|---|---|---|---|---|
| | | 16 | 17 | 18 | 19 | 20 | 21 | 22 |
| Mold release agent | SA | | 0.08 | 0.08 | | 0.08 | | 0.08 |
| | SL | | | | 0.2 | | 0.02 | |
| | PT | 0.02 | | | | | | |
| Fluorescent dye | FR | | 0.01 | | | | | |
| | FO | | | 0.005 | | | | 0.01 |
| | HP | | | | | | 0.02 | |
| General dye | B | | | 0.0003 | | 0.015 | | |
| | Y | | | | 0.025 | | | |
| Light-diffusing agent | A | | | | 0.5 | | | |
| | S | | | | | | 0.05 | |
| Ultraviolet absorbent | TN | 0.1 | | | | | | |
| | CS | | | | 0.1 | | | |
| Sample symbol | | PC(A) | PC(B) | PC(C) | PC(D) | PC(E) | PC(F) | PC(G) |

Symbols for components shown in the column of the raw material in Table 10 stand for the following.
(Thermoplastic Resin)
PC: Polycarbonate resin powder having a viscosity average molecular weight of 19,700 (Panlite L-1225, supplied by Teijin Chemicals Ltd.)
(Phosphorus Stabilizer)
PQ: Stabilizer containing, as a main component, tetrakis(2,4-di-tert-butylphenyl)4,4'-biphenylene-diphosphonite (Sandstab P-EPQ PLUS, supplied by Clariant Japan K.K.)
M: Trimethyl phosphate (TMP, supplied by Daihachi Chemical Industry Co., Ltd.)
IR: Tris(2,4-di-tert-butylphenyl) phosphite (Irgafos 168, supplied by Nippon Ciba Geigy Ltd.)
(Mold Release Agent)
SA: Monoester of stearic acid and glycerin (Rikemal S-100A, supplied by Riken Vitamin Co., Ltd.)
SL: Mixture of saturated fatty acid triester of glycerin and an ester of a higher alcohol and saturated fatty acid (Rikemal SL900, supplied by Riken Vitamin Co., Ltd.)
PT: Pentaerythritol tetrastearate
(Fluorescent Dye)
FR: Perylene red fluorescent dye (Lumogen F Red 300, supplied by BASF)
FO: Perylene orange fluorescent dye (Lumogen F Orange 240, supplied by BASF)
HP: Coumarin fluorescent brightener (Hakkol PSR, supplied by Hakkol Chemical Co., Ltd.)
(Dye)
B: Anthraquinone blue dye (MACROLEX Blue PR, supplied by Bayer AG)
Y: Quinoline yellow dye (Plast Yellow 8050, supplied by Arimoto Chemical Co., Ltd.)
(Light-diffusing Agent)
A: Acrylic crosslinked particles (Techpolymer MBX-5, supplied by Sekisui Plastics Co., Ltd.)
S: Silicone crosslinked particles (Tospearl 120, supplied by GE Toshiba Silicones Co., Ltd.)
(Ultraviolet Absorbent)
TN: Triazine ultraviolet absorbent (2-(4,6-diphenyl-1,3,5-triazine-2-yl)-5-[(hexyl)oxy] phenol, TINUVIN 1577, supplied by Nippon Ciba Geigy Ltd.)
CS: Benzotriazole ultraviolet absorbent (2-(2-hydroxy-5'-t-octylphenyl)benzotriazole, Chemisorb 79, supplied by CHEMIPRO KASEI KAISHA, LTD.)

Example 15

Making of Automobile Window

Figure 12:
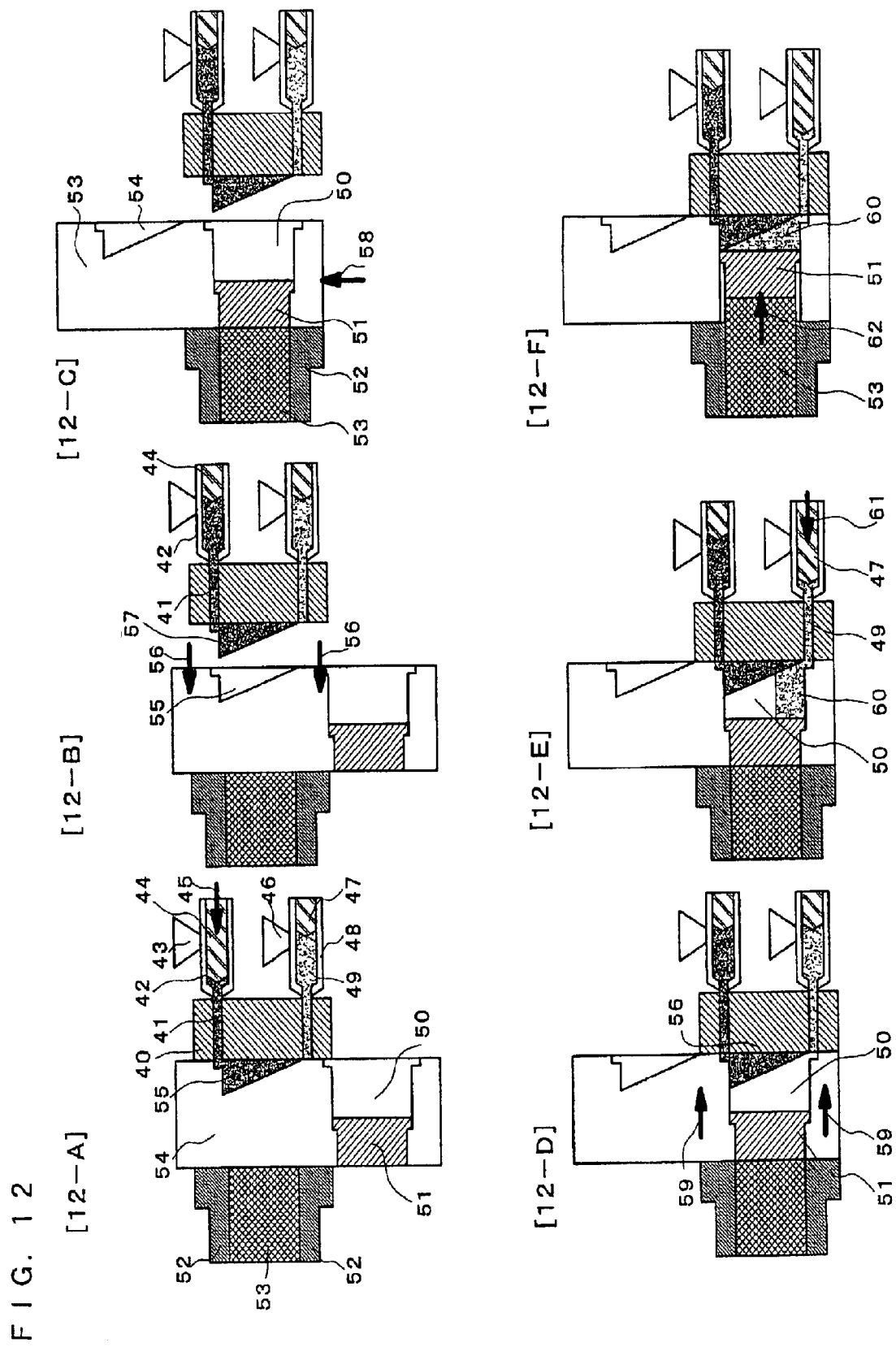
FIGS. 12-A to 12-F show steps of two-color molding and injection press-molding for making an automobile glass window.

The polycarbonate resin (PC(A)) in Referential Example 16 and the polycarbonate resin (PC(B)) in Referential Example 17 were respectively dried with a hot air drier at 120° C. for 5 hours, and then molded with a multiple color molding injection molding machine (FN-8000–36ATN, supplied by Nissei Plastic Industrial Co., Ltd.) equipped with two injection devices having a cylinder internal diameter of 50 mmφ, to obtain a model molded article on the assumption that it was to be used as an automobile rear window shown in FIG. 10. FIG. 11 shows a schematic drawing of a state where it was fixed to an automobile. As shown in FIG. 12, the molding for the above model molded article was carried out by a two-color molding method using a sliding mold member, and the molding for a second layer was carried out by injection press molding. In the molding, both the first injection (first layer: PC(B)) and the second injection (second layer: PC(A)) used valve gate type hot runners, and the hot runners were set at a temperature of 310° C.

Main forms and dimensions of the molded article were as follows. An upper edge had a length of approximately 250 mm in the lateral direction and a curvature of approximately R1, 880 mm, a lower edge had a length of approximately 300 mm in the lateral direction and a curvature of approximately R2, 050 mm, and a length in the height direction was approximately 210 mm. The first layer had a thickness of 5.9 mm on the gate side and a thickness of 0.5 mm on a flow end side. The second layer had a thickness of 5.9 mm on the gate side (flow end side of the first layer) and a thickness of 0.5 mm on a flow end side. The molded article had a total thickness of 6.4 mm and had a uniform thickness. Each of the gate for the first layer and the gate for the second layer were film gates having a wide of approximately 200 mm and a thickness of 2.0 mm each. The change in thickness was made of a plane formed of straight lines connecting both the ends, and a three-dimensional pattern was formed by forming a convex portion having a thickness of +1 mm high from the above plane on the layer formed of PC(B).

Procedures of the molding were as follows. First, as shown in FIG. 12-A, In the first injection step, PC(B) was injected at a cylinder temperature of 300° C. at a mold temperature of 100° C. at an injection rate of 50 mm/second. A dwell-up pressure was set at 30 MPa and cooling was carried out for 30 seconds. In the first injection step, pellets of PC(B) that had been dried with hot air at 120° C. for 5 hours were supplied to a hopper (43) of a first injection unit (42), a resin (41) prepared by melting and plasticizing the pellets with a screw (44) was filled in a mold cavity (55) by the forward operation (45) of a screw. A valve of a hot runner (40) on the first injection side was closed after the dwelling of a pressure. In a second injection unit, pellets of PC(A)

dried with hot air at 120° C. for 5 hours had been also supplied to a hopper (46) of a second injection unit (48) and maintained in a state where the pellets were melted and plasticized with a screw (47).

Then, as shown in FIG. 12-B, the resin in the mold cavity was cooled, then, the mold was moved backward (56) to obtain a molded article (57) for the first layer in a state where the molded article remained in the fixed mold member. After initiation of the cooling, resin calibration for molding to follow was carried out.

Then, as shown in FIG. 12-C, the mold was slid upward (58) to replace the mold cavity for the first injection with a mold cavity for a second injection.

Then, as shown in FIG. 12-D, the mold was closed, to obtain a space for filling of a resin which is surrounded by a mold cavity for the second injection and the molded article for the first layer. In this case, a core plate (51) was brought into a state where it was opened to give a space having a thickness 2 mm larger than a predetermined thickness of the molded article.

And, as shown in FIG. 12-E, in the second injection step, a screw (47) was moved forward (61) to fill PC(A) at a cylinder temperature of 300° C., a mold temperature of 100° C. at an injection rate of 50 mm/second. The filling time period was approximately 3.5 seconds. As shown in the drawing, there was brought a state where the filling of the resin (PC(A)) (60) in the mold cavity was insufficient.

As shown in FIG. 12F, the core plate (51) was moved forward to press (62) the resin in the mold cavity. The forward movement of the core plate was initiated 0.5 second before the filling of the resin was completed (that is, an overlapping time period was 0.5 seconds), and the pressing was carried out at a core plate movement rate of 1 mm/second at a press pressure of 20 MPa. The pressing was performed for approximately 37 seconds after the initiation of the pressing. Then, the press pressure was adjusted to 0 MPa, followed by cooling for 45 seconds, and a molded article was taken out after the cooling.

(ii) Surface Coating Treatment

Further, a hard coating was formed on the surface (surface of the layer formed of PC(A) by injection press molding) of the thus-obtained laminated structure which surface was to form an outer side of an automobile, by the following procedures. That is, a coating composition (i-1) shown below was applied to one surface of the laminated structure with a flow coater, and the applied coating composition was left at 25° C. for 20 minutes and then thermally cured at 120° C. for 30 minutes to form a first layer. Then, a coating composition (ii-1) shown below was further applied with a flow coater, and the applied coating composition was left at 25° C. for 20 minutes and then thermally cured at 120° C. for 2 hours to form a second layer. The first layer had a thickness of approximately 2 $\mu$m, and the second layer had a thickness of approximately 5 $\mu$m. The thus-obtained laminated structure was a molded article that was free of a strain and was excellent, and was sufficient for practical use when applied to an automobile as shown in FIG. 11. The laminated structure had a specifically elaborate design having a gradation in color tone for an automobile glass window. Further, laminated structure worked to display three-dimensional letters that were in a central portion when light was introduced toward a side surface on the lower side (larger-thickness portion side of PC(B)) of the laminated structure, and it had a high value for an automobile glass window specifically having an unconventional elaborate design.

Coating Composition (i-1)

A flask having are flux condenser and a stirrer and having been flushed with nitrogen was charged with 70 parts of methyl methacrylate (to be abbreviated as "MMA" hereinafter), 39 parts of 2-hydroxyethyl methacrylate (to be abbreviated as "HEMA" hereinafter), 0.18 part of azobisisobutyronitrile (to be abbreviated as "AIBN" hereinafter) and 200 parts of 1,2-dimethoxyethane, and these components were mixed and dissolved. Then, these components were allowed to react with stirring under nitrogen current at 700° C. for 6 hours. The resultant reaction mixture was purified by reprecipitation in n-hexane, to give 90 parts of a copolymer (acrylic resin (I)) having an MMA/HEMA component ratio of 70/30 (molar ratio). The copolymer had a weight average molecular weight, as a polystyrene, of 80,000 on the basis of GPC measurement (column; Shodex GPC A-804, eluant; THF).

142 Parts of methyltrimethoxysilane, 72 parts of distilled water and 20 parts of acetic acid were mixed with cooling with ice water, and the mixture was stirred at 25° C. for 1 hour and diluted with 116 parts of isopropanol, to give 350 parts of a methyltrimethoxysilane hydrolysis condensate solution (X). On the other hand, 208 parts of tetraethoxysilane and 81 parts of 0.01N hydrochloric acid were mixed with cooling with ice water, and the mixture was stirred at 25° C. for 3 hours and diluted with 11 parts of isopropanol, to give 300 parts of a tetraethoxysilane hydrolysis condensation solution (Y).

Then, 8 parts of the above acrylic resin (I) was dissolved in a solvent mixture containing 40 parts of methyl ethyl ketone, 20 parts of methyl isobutyl ketone, 5.2 parts of ethanol, 14 parts of isopropanol and 10 parts of 2-ethoxyethanol. Then, 10 parts of the methyltrimethoxysilane hydrolysis condensate (X) was added thereto, and the mixture was stirred at 25° C. for 5 minutes. Further, 1 part of a melamine resin (Cymel 303, supplied by Mitsui Cytec Ltd.) was added, and the mixture was stirred at 25° C. for 5 minutes, to give a coating composition (i-1).

Coating Composition (ii-1)

As a composition for a second layer of a hard coating, 12 parts of distilled water and 20 parts of acetic acid were added to 100 parts of a water-dispersible colloidal silica dispersion (Snowtex 30, supplied by Nissan Chemical Industries, Ltd., solid content 30% by weight), and the mixture was stirred. To the resultant dispersion was added 134 parts of methyltrimethoxysilane with cooling with an ice bath. The mixture was stirred at 25° C. for 1 hour to obtain a reaction mixture, and 20 parts of the tetraethoxysilane hydrolysis condensate solution (Y) and 1 part of sodium acetate as a curing catalyst were added to the reaction mixture. The mixture was diluted with 200 parts of isopropanol, to obtain a coating composition (ii-1).

Example 16

Making of Illuminating Globe

A spherical illuminating globe (lamp cover molded article) formed by combining semi-spherical laminated structures shown in FIGS. 13 and 14 were formed with the same molding machine as that in Example 1 and nearly at the same molding temperature and same injection rates as those in Example 1. In the molded article, as shown in the schematic cross-sectional view thereof in FIG. 14, an upper front surface layer was formed of PC(D) having light-diffusing properties and an upper reverse surface was formed of PC(C). The molded article had a diameter of approximately 10 cm and a thickness of 6 mm. The portion made of PC(D) was first formed, and then a laminated structure was formed by insert molding in which such a portion as a molded article was inserted. The insert molding was carried out by injection press-molding. The thus-obtained laminated structure was for use as a lamp cover as shown in FIG. 13, and gave an appearance showing a moderate change in color.

Example 17

Making of Dome-Shaped Fluorescent Lamp Cover

A semi-spherical dome-shaped fluorescent lamp cover was formed with the same molding machine as that in Example 1 nearly at the same molding temperature and the same injection rates as those in Example 1. In the molded article, a front surface portion of the molded article was formed of nearly transparent PC(C), and a reverse surface was formed of PC(D). The laminated structure had a diameter of approximately 200 mm, a height of approximately 50 mm and a thickness of 6 mm.

For the above molded article, a portion made of PC(D) was first formed (using two side gates on circumferential portions), and insert molding (using one direct gate in a top portion of a reverse surface) was carried out to form the laminated structure. In the insert molding, injection press-molding was carried out. The laminated structure had a constitution in which the layer made of PC(C) had a larger thickness in a top portion of a dome and the layer made of PC(D) had a larger thickness in a circumferential portion of the dome. The thus-obtained laminated structure was for use as a fluorescent lamp cover and had an elaborate design rich with a change in brightness.

Example 18

Making of Lamp Cover

A semi-spherical laminated structure was obtained in the same manner as in the above Example 17 and cut in halves with regard to a symmetrical axis, to make a lamp cover. A light source prepared by aligning white light LEDs was arranged in the side end portion which is the cut side. The front surface layer portion of the molded article was formed of PC(F) containing a light-diffusing agent, and the reverse surface layer portion was formed of PC(E). These layers had a change in thickness. The thus-obtained laminated structure had low transparency in a portion near the light source, so that it emitted moderate light, and further, the entire cover emitted proper light due to the light source of LEDs arranged in the side end portion which is the cut side. The above proper light was suitable at bedside, and a color tone having gradation looked comfortable.

Example 19

Making of Box-shaped Container

Four plate-like laminated structures were attached to make a box-shaped container having a gradation color tone shown in FIG. 15-A. The plate-shaped laminated structures for use were formed with the same molding machine as that in Example 1 and nearly at the same molding temperature and the same injection rates as those in Example 1. Each of the plate-like laminated structures was formed of a reverse layer portion formed of PC(B) containing a fluorescent dye and PC(G) and a front layer portion formed of PC(C). Each of the plate-like laminated structures had a height of 150 mm, a width of 150 mm and a thickness of 5 mm. Each layer had a thickness of 4 mm on a gate side and a thickness of 1 mm on a flow end side. Film gates having a thickness of 1 mm were used as gates. A change in thickness was made by a place formed of straight lines connecting both ends, and a three-dimensional pattern was formed by making a convex portion having a thickness of +1 mm from the surface of the layer formed of PC(B) and PC(G) and higher from on the layer. The first layer (layer formed of PC(B) and PC(G)) was separately formed, then, the thus-obtained molded article was inserted, and the second layer (layer formed of PC(C) was formed by injection press-molding. After the four plate-like laminated structures were attached, a light source portion prepared by arranging white light LEDs was arranged in a side surface portion on the lower side (larger-thickness portion of the layer formed of PC(C)), to form a box-shaped laminated structure. The above light source achieves a design in which the formed three-dimensional pattern was caused to be floating as a three-dimensional pattern. FIG. 15-A shows that a highly elaborately designed CD player can be produced by inserting a CD player in the above box-shaped laminated structure. The intensity of the light source and the color are changed depending upon a change in audio information, whereby a highly elaborate design can be achieved.

Example 20

Making of Water Tank

A plate-like laminated structure was used as one sidewall of four sidewalls, and a highly elaborately designed water tank was made. For the plate-like laminated structure, a layer made of PC(E) was formed as a first layer separately, and in a state where the first layer was inserted, a layer made of PC(F) was formed as a second layer by injection press-molding. A three-dimensional pattern was formed by making a +1 mm thick convex portion made of PC(E) on the layer made of PC(E) in the same manner as in Example 19. Further, white a light source prepared by arranging while-light LEDs was arranged in a side surface portion on the upper side (larger thickness portion of the layer made of PC(F)), so that there was provided a constitution in which the entire laminated structure was uniformly bright in blue. The water tank having the above laminated structure as an inner surface of a far sidewall was improved in appearance for appreciation.

Example 21

Making of Ruler

A ruler made of a laminated structure was formed. An upper surface side was formed of a PC(C) layer, and a lower surface side was formed of a PC(E) layer. A three-dimensional pattern having a convex form was formed on the lower surface side, and in a state where the layer having the lower side surface was inserted, injection press-molding was carried out to form the ruler. The thus-obtained ruler had two layers having a change in thickness each, and had a change in color tone and a pattern, and the ruler had a highly elaborate design.

Effect of the Invention

According to the present invention, there can be provided a laminated structure that has a continuous change in color tone (gradation color) with a high degree of freedom, and which permits formation of a variety of three-dimensional letters, drawings and patterns that can be expressed inside.

It is expected that the sheet-shaped laminated structure of the present invention can be applied to various uses since it is excellent in characteristic changes in color tone and three-dimensional expressions of letters, characters and figures. For example, it can be applied to an automobile window, a display case, an illuminating device and a box-shaped container, and in addition to these, it can be also applied to decorative illumination (vending machines, game machines such as a slot machine, and sign boards), a windshield for a vehicle, a helmet, a windshield for a helmet, eyeglasses, a protective shield, furniture and miscellaneous goods (writing materials, tableware, cleaning tools, cooking utensils, containers for small articles, and toys).

What is claimed is:

1. A sheet-shaped laminated structure wherein:
   (1) the sheet-shaped laminated structure is a sheet-shaped laminated structure composed of at least two layers formed of a thermoplastic resin each,
   (2) at least one layer forming a surface of said laminated structure is a layer (B) formed of a transparent resin,
   (3) at least one layer composing said laminated structure contains a dye, a pigment or a light-diffusing agent and has a monotonous thickness change at least in one direction of a sheet surface of the laminated structure,
   (4) said laminated structure shows a continuous change in color tone along the sheet surface when visually observed toward an outer surface of the layer (B) formed of a transparent resin,
   (5) a three-dimensional pattern of a letter, character or figure is formed in an interfacial portion where the two layers are in contact with each other, and
   (6) (6-I) one layer is formed of a transparent resin containing a fluorescent dye and has a monotonous change in thickness at least in one direction along a sheet surface, and the other layer is formed of a substantially colorless and transparent resin or a transparent resin containing a dye or a pigment having a color different from a color of said layer,
      (6-II) one layer is formed of a transparent resin containing a dye or a pigment and has a monotonous change in thickness at least in one direction along a sheet surface, and the other layer k formed of a transparent resin containing a light-diffusing agent, or
      (6-III) one layer is formed of a transparent resin containing a dye or a pigment and has a monotonous change in thickness at least in one direction along a sheet surface, and the other layer is formed of a transparent resin containing a high light-reflecting agent.

2. The sheet-shaped laminated structure of claim 1, wherein (6) (6-I) one layer is formed of a transparent resin containing a fluorescent dye and has a monotonous change in thickness at least in one direction along a sheet surface, and the other layer is formed of a substantially colorless and transparent resin or a transparent resin containing a dye or a pigment having a color different from a color of said layer, or
   (6-II) one layer is formed of a transparent resin containing a dye or a pigment and has a monotonous change in thickness at least in one direction along a sheet surface, and the other layer is formed of a transparent resin containing a light-diffusing agent.

3. The sheet-shaped laminated structure of claim 1, which has an average thickness of a 1 to 50 mm.

4. The sheet-shaped laminated structure of claim 1, wherein the transparent resin is a polycarbonate resin, a polyalkyl methacrylate resin, a cylcopolyolefin resin or an amorphous polyarylate resin.

5. The sheet-shaped laminated structure of claim 1, wherein the transparent resin is a polycarbonate resin.

6. The sheet-shaped laminated structure of claim 1, wherein all the layers are formed of the same type of resin, and the resin is selected from the group consisting of a polycarbonate resin, a polyalkyl methacrylate resin, a cylcopolyolefin resin or an amorphous polyarylate resin.

7. The sheet-shaped laminated structure of claim 1, wherein all the layers are formed of a polycarbonate resin.

8. The sheet-shaped laminated structure of claim 1, wherein at least one layer is formed by injection molding.

9. The sheet-shaped laminated structure of claim 1, wherein all the layers formed by injection molding.

10. The sheet-shaped laminated structure of claim 1, which has the form of a flat plate, a semi-sphere, or a semi-cylinder.

11. A decorative organic glass or glass window, made of the sheet-shaped laminated structure recited in claim 2.

12. A sheet-shaped laminated structure comprising the sheet-shaped laminated structure recited in claim 1 and a light source portion, the light source portion being provided in a side end portion of the laminated structure.

13. A sheet-shaped laminated structure comprising the sheet-shaped laminated structure recited in claim 2 and a light source portion, the light source portion being provided in a side end portion of the laminated structure.

14. The sheet-shaped laminated structure of claim 12, wherein the side end portion where the light source portion is provided in the laminated structure is an end portion from which a layer containing a dye, a pigment or a light-diffusing agent and having a monotonous change in thickness is formed toward the other side corresponding thereto.

15. A decorative organic glass or glass window comprising the sheet-shaped laminated structure recited in claim 13.

16. The decorative organic glass or glass window of claim 15, wherein one layer of the sheet-shaped laminated structure is formed of a transparent resin containing a fluorescent dye and has a monotonous change in thickness at least in one direction along a sheet surface, and the other layer thereof is formed of a substantially colorless and transparent resin.

17. An automobile window, comprising the sheet-shaped laminated structure recited in claim 2.

18. The automobile window of claim 17, which is a front door window, a rear door window, a rear window, a quarter window or a sunroof window.

19. The automobile window of claim 17, wherein a light source portion is provided in a side end portion of the sheet-shaped laminated structure.

20. A box-shaped container having at least one surface made of the sheet-shaped laminated structure recited in claim 1.

21. The box-shaped container of claim 20, wherein said at least one surface is a visible portion of said container.

22. The box-shaped container of claim 20, wherein a light source portion is provided in a side end portion of the sheet-shaped laminated structure.

23. The box-shaped container recited in claim 20 comprising a housing for electric machine or apparatus.

24. The box-shaped container recited in claim 20 comprising a housing for an electronic machine or apparatus.

25. The box-shaped container recited in claim 20 comprising a housing for an optical machine or apparatus.

26. The box-shaped container recited in claim 20 comprising a housing for a light source.

27. A decorative illuminating globe that is the sheet-shaped laminated structure recited in claim 2, said laminated structure having the form of a semi-sphere and being adapted for arranging a light source potion inside the semi-sphere.

28. A decorative illuminating globe that is a combination of the sheet-shaped laminated structures as recited in claim 2, said laminated structures having the form of a semi-sphere each and being combined together so as to shape a spherical form, the two laminated structures being adapted for arranging a light source portion inside the stacked laminated structures having the spherical form.

29. A decorative illuminating globe that is the sheet-shaped laminated structure recited in claim 2, said laminated structure having a semi-cylindrical form and being adapted for arranging a light source portion inside the semi-cylindrical form.

30. A decorative organic glass or glass window comprising the sheet-shaped laminated structure recited in claim 8.

31. A decorative organic glass or glass window of claim 30, wherein one layer of sheet-shaped laminated structure is formed of a transparent resin containing a fluorescent dye and has a monotonous change in thickness at least in one direction along a sheet surface, and the other layer thereof is formed of a substantially colorless and transparent resin.

* * * * *